(12) United States Patent
Sugitate et al.

(10) Patent No.: US 10,434,897 B2
(45) Date of Patent: Oct. 8, 2019

(54) VEHICLE HIGH-VOLTAGE SYSTEM EQUIPMENT UNIT, VEHICLE BATTERY UNIT AND VEHICLE

(71) Applicant: HONDA MOTOR CO., LTD., Tokyo (JP)

(72) Inventors: Kenta Sugitate, Wako (JP); Tomomi Kurita, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/244,538

(22) Filed: Jan. 10, 2019

(65) Prior Publication Data
US 2019/0210483 A1 Jul. 11, 2019

Related U.S. Application Data

(63) Continuation of application No. 15/552,598, filed as application No. PCT/JP2015/085067 on Dec. 15, 2015.

(51) Int. Cl.
*B60K 1/04* (2019.01)
*B60L 58/00* (2019.01)
(Continued)

(52) U.S. Cl.
CPC .............. *B60L 58/00* (2019.02); *B60K 1/04* (2013.01); *B60K 11/06* (2013.01); *B60L 3/0046* (2013.01);
(Continued)

(58) Field of Classification Search
CPC .... B60K 2001/0416; B60K 2001/0422; B60K 2001/0427; B60K 2001/0433; B60K 2001/0438
(Continued)

(56) References Cited

U.S. PATENT DOCUMENTS 5,392,873 A * 2/1995 Masuyama ............. B60R 16/04
180/68.5
5,501,289 A * 3/1996 Nishikawa ............... B60K 1/04
180/68.5
(Continued)

FOREIGN PATENT DOCUMENTS

JP 2003-306045 A 10/2003
JP 2005-007915 A 1/2005
(Continued)

OTHER PUBLICATIONS

International Search Report & Written Opinion dated Mar. 15, 2016 corresponding to International Patent Application No. PCT/JP2015/085067. No copy provided, per MPEP 609.
(Continued)

*Primary Examiner* — Jeffrey J Restifo
(74) *Attorney, Agent, or Firm* — Squire Patton Boggs (US) LLP

(57) ABSTRACT

A vehicle high-voltage system equipment unit includes a high-voltage system equipment, and a cooling fan for taking in air from a passenger compartment. The high-voltage system equipment is cooled with air taken in from the passenger compartment, the cooling fan is provided on an upstream side of the high-voltage system equipment, and an air discharge portion is provided on a downstream side of the high-voltage system equipment, a branch portion for dividing a flow of air used to cool the high-voltage system equipment is provided in the air discharge portion, an air flow regulating portion is provided on an upstream side of the branch portion, and the air flow regulating portion is formed integrally with the high-voltage system equipment.

10 Claims, 13 Drawing Sheets

(51) Int. Cl.
   *B60K 11/06*    (2006.01)
   *B62D 25/20*    (2006.01)
   *H01M 2/10*     (2006.01)
   *H01M 10/625*   (2014.01)
   *H01M 10/6563*  (2014.01)
   *H01M 10/647*   (2014.01)
   *H01M 10/613*   (2014.01)
   *H01M 10/663*   (2014.01)
   *H01M 10/615*   (2014.01)
   *B60L 3/00*     (2019.01)
   *B60L 58/24*    (2019.01)
   *B60L 58/26*    (2019.01)
   *B60K 1/00*     (2006.01)

(52) U.S. Cl.
   CPC ............. *B60L 58/24* (2019.02); *B60L 58/26* (2019.02); *B62D 25/20* (2013.01); *H01M 2/10* (2013.01); *H01M 2/1005* (2013.01); *H01M 10/613* (2015.04); *H01M 10/615* (2015.04); *H01M 10/625* (2015.04); *H01M 10/647* (2015.04); *H01M 10/6563* (2015.04); *H01M 10/663* (2015.04); *B60K 2001/005* (2013.01); *B60K 2001/0422* (2013.01); *B60K 2001/0433* (2013.01); *B60K 2001/0438* (2013.01); *H01M 2220/20* (2013.01)

(58) Field of Classification Search
   USPC ........................................................ 180/68.5
   See application file for complete search history.

(56) References Cited

U.S. PATENT DOCUMENTS

| | | | | |
|---|---|---|---|---|
| 5,641,031 | A * | 6/1997 | Riemer | B60K 1/04 429/423 |
| 6,220,383 | B1 * | 4/2001 | Muraki | B60K 1/04 180/68.5 |
| 6,541,151 | B2 * | 4/2003 | Minamiura | H01M 10/625 180/68.5 |
| 6,662,891 | B2 * | 12/2003 | Misu | B60K 1/04 180/68.1 |
| 7,021,412 | B2 * | 4/2006 | Koike | H01M 2/1055 180/68.5 |
| 7,025,159 | B2 * | 4/2006 | Smith | B60H 1/00278 180/68.1 |
| 7,048,321 | B2 * | 5/2006 | Bandoh | B60N 3/101 296/37.8 |
| 7,051,825 | B2 * | 5/2006 | Masui | B60K 1/04 180/68.5 |
| 7,417,861 | B2 * | 8/2008 | Kikuchi | H01L 25/162 361/718 |
| 7,424,926 | B2 * | 9/2008 | Tsuchiya | B60R 16/04 180/65.1 |
| 7,569,957 | B2 * | 8/2009 | Aoki | H01L 23/473 310/52 |
| 7,607,501 | B2 * | 10/2009 | Smith | B60H 1/00278 180/68.1 |
| 7,654,351 | B2 * | 2/2010 | Koike | B60K 1/04 180/68.5 |
| 7,678,494 | B2 * | 3/2010 | Tsuchiya | H01M 2/1072 429/120 |
| 7,688,582 | B2 * | 3/2010 | Fukazu | B60K 1/04 361/690 |
| 7,810,596 | B2 * | 10/2010 | Tsuchiya | B60K 1/04 180/68.1 |
| 7,900,727 | B2 * | 3/2011 | Shinmura | B60K 1/04 180/68.1 |
| 8,016,063 | B2 * | 9/2011 | Tsuchiya | B60K 1/04 180/68.1 |
| 8,556,017 | B2 * | 10/2013 | Kubota | B60K 1/04 180/68.1 |
| 8,567,543 | B2 * | 10/2013 | Kubota | B60K 1/04 180/68.5 |
| 8,701,811 | B2 * | 4/2014 | Robinson | B60K 11/06 180/68.2 |
| 8,763,740 | B2 * | 7/2014 | Marcath | B60K 1/04 180/68.2 |
| 8,820,455 | B2 * | 9/2014 | Nitawaki | B60L 11/1874 180/68.5 |
| 8,844,661 | B2 * | 9/2014 | Favaretto | B62D 25/025 180/68.4 |
| 8,887,695 | B2 * | 11/2014 | Aso | F02M 25/0854 123/518 |
| 9,000,724 | B2 * | 4/2015 | Minami | B60H 1/00278 320/109 |
| 9,016,412 | B2 * | 4/2015 | Janarthanam | B60L 58/21 180/68.1 |
| 9,054,398 | B2 * | 6/2015 | Ohkuma | B60K 1/04 |
| 9,054,399 | B2 * | 6/2015 | Mishima | B60K 1/04 |
| 9,126,477 | B2 * | 9/2015 | Zhu | B60K 1/04 |
| 9,150,095 | B2 * | 10/2015 | Matano | B60K 11/04 |
| 9,160,042 | B2 * | 10/2015 | Fujii | B60K 1/04 |
| 9,180,773 | B2 * | 11/2015 | Honda | B60K 11/06 |
| 9,302,573 | B2 * | 4/2016 | Janarthanam | B60H 1/00278 |
| 9,490,459 | B2 * | 11/2016 | Takizawa | H01M 10/625 |
| 9,616,765 | B2 * | 4/2017 | Yamatani | B60K 1/04 |
| 9,623,741 | B2 * | 4/2017 | Honda | B60K 1/04 |
| 9,802,474 | B2 * | 10/2017 | Kawabata | B60K 11/06 |
| 9,849,768 | B2 * | 12/2017 | Hayashi | B60R 16/04 |
| 9,873,456 | B2 * | 1/2018 | Hara | B60K 1/04 |
| 9,966,640 | B2 * | 5/2018 | Kumagai | B60K 1/04 |
| 9,969,274 | B2 * | 5/2018 | Yoon | B60L 11/18 |
| 9,975,416 | B2 * | 5/2018 | Hara | B62D 25/20 |
| 10,220,670 | B2 * | 3/2019 | Koyama | B60L 58/26 |
| 2007/0292752 | A1 * | 12/2007 | Tsuchiya | H01M 2/1072 429/120 |
| 2008/0062622 | A1 * | 3/2008 | Fukazu | B60K 1/04 361/678 |

FOREIGN PATENT DOCUMENTS

| | | |
|---|---|---|
| JP | 2008-062780 A | 3/2008 |
| JP | 2008-062781 A | 3/2008 |
| JP | 2013-244756 A | 12/2013 |
| JP | 2013-244768 A | 12/2013 |
| WO | WO 2006/109413 A1 | 10/2006 |

OTHER PUBLICATIONS

International Preliminary Report on Patentability dated Apr. 17, 2017 corresponding to International Patent Application No. PCT/JP2015/085067. No copy provided, per MPEP 609.

\* cited by examiner

VEHICLE HIGH-VOLTAGE SYSTEM EQUIPMENT UNIT, VEHICLE BATTERY UNIT AND VEHICLE

CROSS REFERENCE TO RELATED APPLICATION

This is a Divisional Application of U.S. patent application Ser. No. 15/552,598 filed on Aug. 22, 2017, which is a 371 Application of International Patent Application No. PCT/JP2015/085067, filed on Dec. 15, 2015, and claims priority from Japanese Patent Application No. 2015-044749, filed Mar. 6, 2015; Japanese Patent Application No. 2015-044748 filed Mar. 6, 2015; and Japanese Patent Application No. 2015-044747 filed Mar. 6, 2015. The contents of these applications are hereby incorporated by reference.

TECHNICAL FIELD

The present invention relates to a vehicle high-voltage system equipment unit for cooling high-voltage system equipment accommodated inside with air taken in from a passenger compartment, a vehicle battery unit for cooling a battery accommodated inside with air taken in from a passenger compartment, and a vehicle.

BACKGROUND ART

A high-voltage system equipment unit which accommodates therein high-voltage system equipment and/or a battery unit which accommodates therein a battery is installed in a vehicle using a motor as a drive source such as an electric vehicle, a hybrid electric vehicle or the like. In vehicles of this type, in order to prevent the deterioration in performance of the high-voltage system equipment and/or the battery due to an abnormal increase in temperature, the high-voltage system equipment and/or the battery is cooled with air taken in from the passenger compartment to maintain the temperature of the high-voltage system equipment and/or the battery in a proper range.

In the vehicle described in Patent Literature 1, it is described that a discharge passage is formed by a floor board and ribs at a downstream of a battery for passage of air used to cool the battery and that the air used to cool the battery is divided to the left and right by a branch portion in the discharge passage.

In the vehicle described in Patent Literature 2, a battery unit is disposed underneath a floor below a front seat. In addition, an air introduction duct whose air inlet port is formed in a rear seat side step disposed on one side of a transverse direction of a vehicle is attached to one end portion of the battery unit in the transverse direction, and an air discharge duct whose air outlet port is formed in a rear seat side step disposed on the other side of the transverse direction is attached to the other end portion of the battery unit in the transverse direction, so that air is circulated within a passenger compartment to cool the batteries.

PRIOR ART LITERATURE

Patent Literature

Patent Literature 1: JP-A-2005-7915
Patent Literature 2: JP-A-2003-306045

SUMMARY OF THE INVENTION

Problem that the Invention is to Solve

In the configuration described in Patent Literature 1, however, since the air used to cool the battery is guided directly into the branch portion in the discharge passage, exhaust air cannot be divided smoothly, resulting in fears that a pressure loss is increased.

In addition, in the configuration described in Patent Literature 2, since not only the air introduction duct but also the air discharge duct is attached to the battery unit, the air discharge duct needs to be laid out properly on the vehicle, resulting in fears that the assembling performance is deteriorated. Additionally, the relative position between the battery unit and the air discharge duct needs to be restricted somehow, resulting in fears that the installation performance of the battery unit is also deteriorated.

Further, in general, when exhaust air used to cool a battery is applied directly to an occupant in a passenger compartment, the occupant may feel uncomfortable, and therefore, a way to return the exhaust air into the passenger compartment needs to be devised. In the configuration described in Patent Literature 2, too, there is room for improvement in how to configure the discharge path.

A first object of the invention is to provide a vehicle high-voltage system equipment unit and a vehicle which can divide smoothly a flow of air used to cool a high-voltage system equipment.

A second object of the invention is to provide a vehicle battery unit and a vehicle which not only facilitate the installation of the battery unit on the vehicle but also provide a superior assembling performance.

A third object of the invention is to provide a vehicle which provides superior comfortableness and a superior assembling performance.

Means for Solving the Problem

The invention provides the following aspects.

According to a first aspect, there is provided a vehicle high-voltage system equipment unit (e.g., the IPU 20 in the embodiment) including:
a high-voltage system equipment (e.g., a DC-DC converter 41 in the embodiment); and
a cooling fan (e.g., a cooling fan 43 in the embodiment) for taking in air from a passenger compartment,
wherein the high-voltage system equipment is cooled with air taken in from the passenger compartment,
wherein the cooling fan is provided on an upstream side of the high-voltage system equipment, and an air discharge portion (e.g., an air discharge passage 33 in the embodiment) is provided on a downstream side of the high-voltage system equipment,
wherein a branch portion (e.g., a branch portion 36 in the embodiment) for dividing a flow of air used to cool the high-voltage system equipment is provided in the air discharge portion,
wherein an air flow regulating portion (e.g., cooling fins 41b in the embodiment) is provided on an upstream side of the branch portion, and
wherein the air flow regulating portion is formed integrally with the high-voltage system equipment.

According to a second aspect, there is provided a vehicle battery unit (e.g., the IPU 20 in the embodiment) including:
a battery (e.g., batteries 40 in the embodiment) having a battery accommodating portion (e.g., an IPU accommodating portion 22 in the embodiment) that accommodates therein the battery;

a case (e.g., an IPU case 21 in the embodiment) having a battery accommodating portion that accommodates therein the battery; and a cover (e.g., an IPU cover 26 in the embodiment) that covers an opening portion (e.g., an opening portion 23 in the embodiment) of the case, wherein the battery is cooled with air taken in from a passenger compartment, wherein an air discharge passage (e.g., the air discharge passage 33 in the embodiment) is formed on the cover so as to communicate with the battery accommodating portion and discharge the air used to cool the battery, and wherein the air discharge passage extends towards at least one side of a vehicle in a transverse direction thereof and has an air outlet port (e.g., an IPU air outlet port 29 in the embodiment) at an end portion on the at least one side of the vehicle.

According to a third aspect, there is provided a vehicle including:

a front seat (e.g., front seats 1 in the embodiment);

a battery (e.g., the batteries 40 in the embodiment) which is accommodated in a battery accommodating portion (e.g., an IPU protection case 8 in the embodiment) provided on a floor panel (e.g., a floor panel 3 in the embodiment) and which is disposed below the front seat;

a sliding door (e.g., sliding doors 9 in the embodiment) which is positioned obliquely rearwards of the front seat;

a step (e.g., steps 60 in the embodiment) which is disposed on the floor panel so as to lie adjacent to the sliding door; and a rail accommodating portion (e.g., rail accommodating portions 17 in the embodiment) which is positioned underneath the step and in which a rail (e.g., rails 18 in the embodiment) for guiding a sliding movement of the sliding door is disposed, wherein the battery is cooled with air taken in from a passenger compartment wherein an air discharge path for discharging air used to cool the battery includes: a first air discharge path (e.g., the air discharge passage 33 in the embodiment) which extends in a transverse direction of the vehicle from the battery; and a second air discharge path (e.g., air discharge passages 75 in the embodiment) which is connected to the first air discharge path and an under-step space (e.g., under-step space S1 in the embodiment) provided underneath the step, and wherein the second air discharge path communicates with the rail accommodating portion by way of the under-step space.

Advantages of the Invention

According to the first aspect, exhaust air can be regulated without increasing the number of components by forming the air flow regulating portion integrally with the high-voltage system equipment, and the cooling efficiency of the high-voltage system equipment is increased. In addition, the exhaust air can be divided smoothly by passing through the branch portion after it has been regulated, and a pressure loss can also be reduced.

According to the second aspect, compared with a case where an air discharge duct formed separately from a cover is assembled to the cover, such an air discharge duct does not have to be laid out in the vehicle, which not only facilitates the installation of the battery unit in the vehicle but also improves the assembling performance. Additionally, since the air discharge passage extends in the transverse direction of the vehicle, the vehicle battery unit can be made small in size in relation to a front-rear or longitudinal direction of the vehicle.

According to the third aspect, the air used to cool the battery is discharged into the rail accommodating portion which constitutes a lowest portion of the passenger compartment to thereby cool down the flow of the exhaust air and the temperature of the exhaust air, thereby making it possible to introduce the exhaust air into the passenger compartment in a dispersed and moderate fashion. This restrains the occupant from feeling uncomfortable. Additionally, since the rail accommodating portion constitutes the lowest portion of the passenger compartment and lies near the sliding door, the rail accommodating portion constitutes a portion whose temperature is the lowest in the passenger compartment. Thus, the coefficient of heat exchange is also improved by discharging the exhaust air into the rail accommodating portion.

MODE FOR CARRYING OUT THE INVENTION

Figure 1:
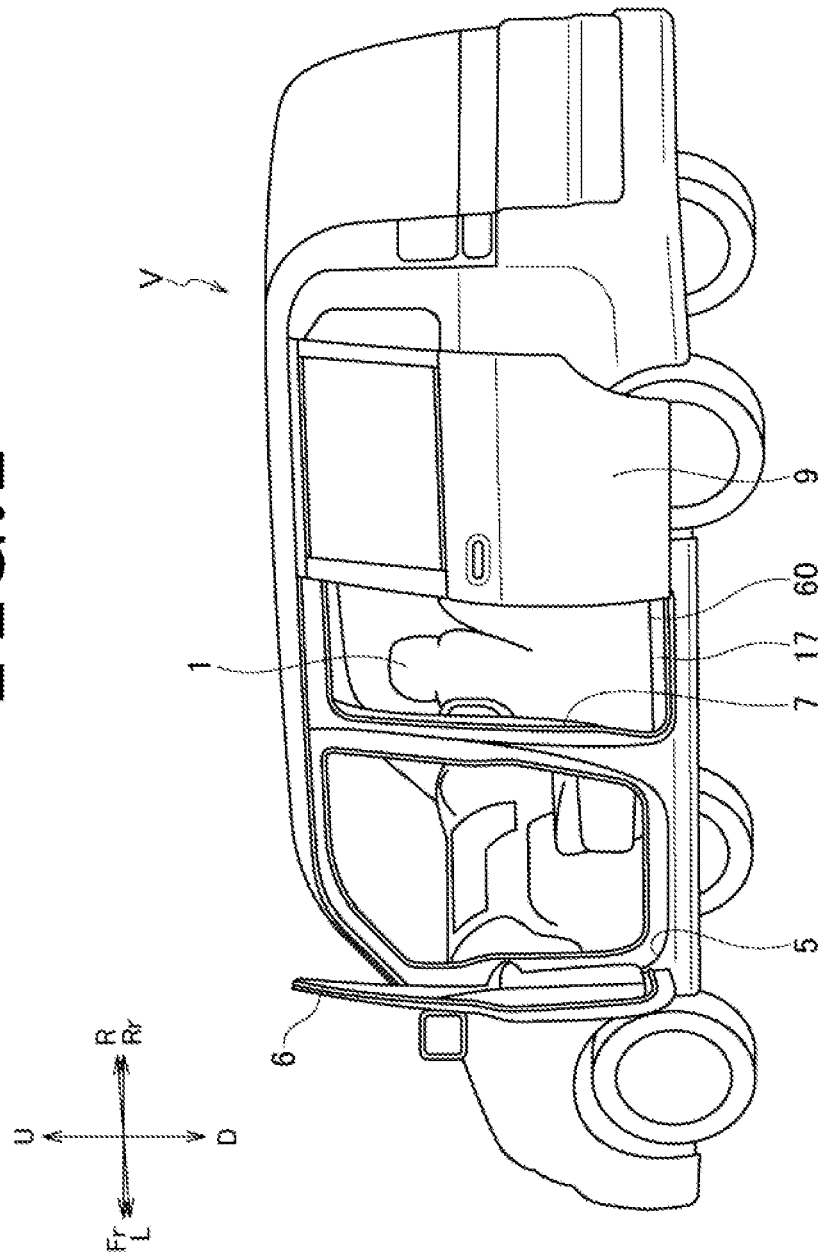
FIG. 1 is a perspective view of an electric vehicle according to an embodiment of the invention as viewed from the left rear thereof.
Figure 2:
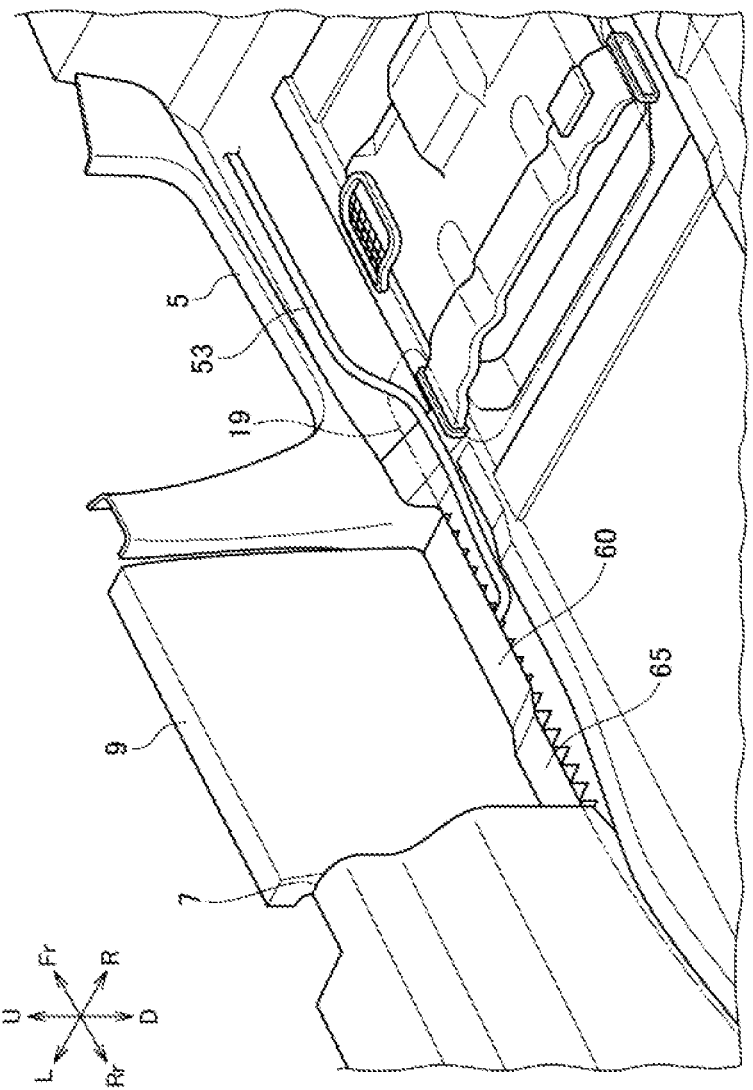
FIG. 2 is a perspective view of a main part of an interior portion of the electric vehicle shown in FIG. 1 as viewed down obliquely from a right upper portion, showing a floor carpet.

Hereinafter, an embodiment of the invention will be described based on the accompanying drawings. The drawings should be seen in a direction in which given reference numerals look normal. In the following description, front, rear, left, right, up and down denote accordingly directions as seen from a driver of a vehicle. Front, rear, left and right sides and upward and downward directions of the vehicle are denoted by Fr, Rr, L, R, U and D, respectively.

An electric vehicle according to this embodiment is an electric vehicle which runs on a driving force of a motor which is driven by electric power supplied from an IPU (Intelligent Power Unit) provided underneath a floor panel.

Figure 12:
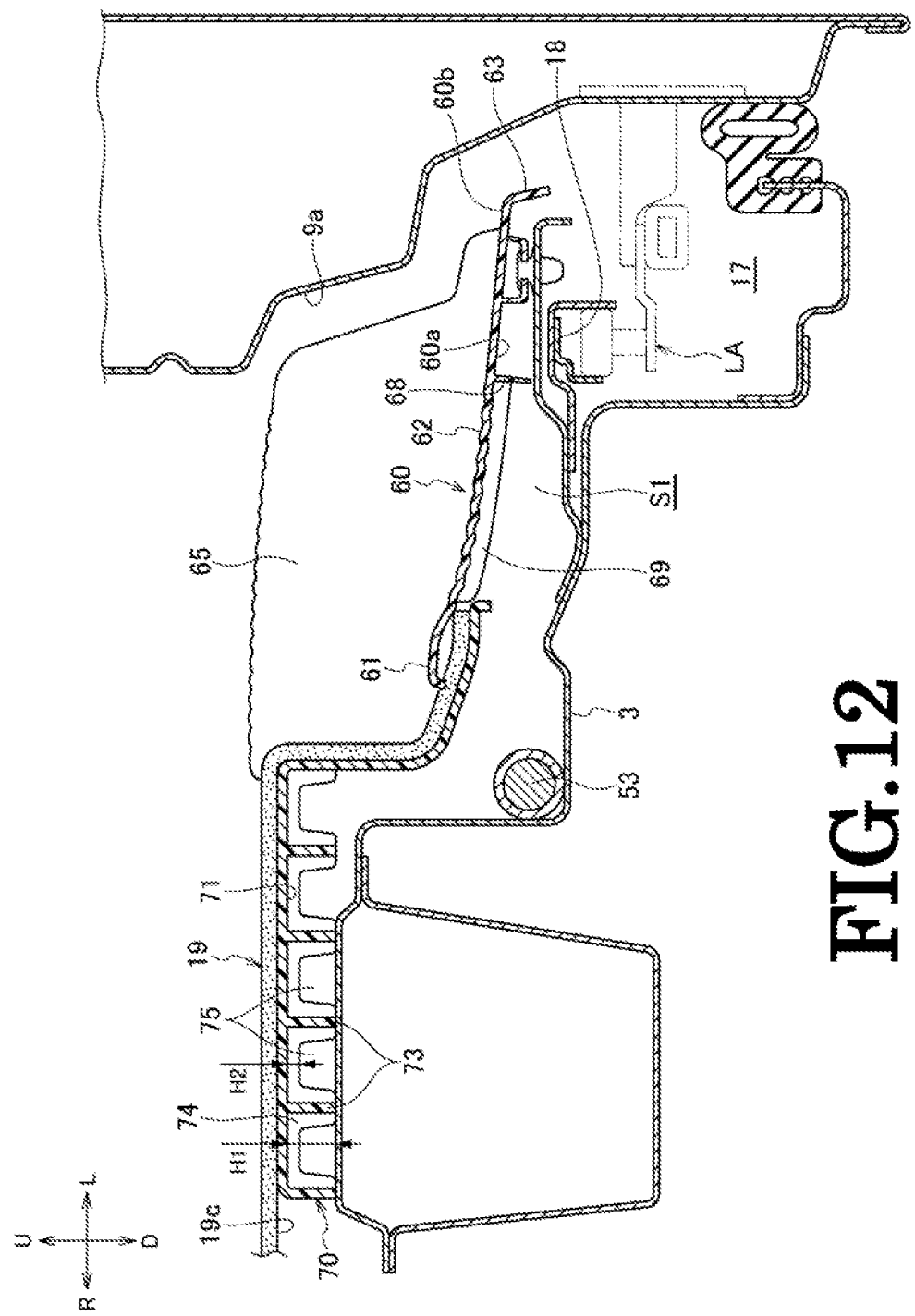
FIG. 12 is a sectional view taken along a line D-D in FIG. 11.
Figure 13:
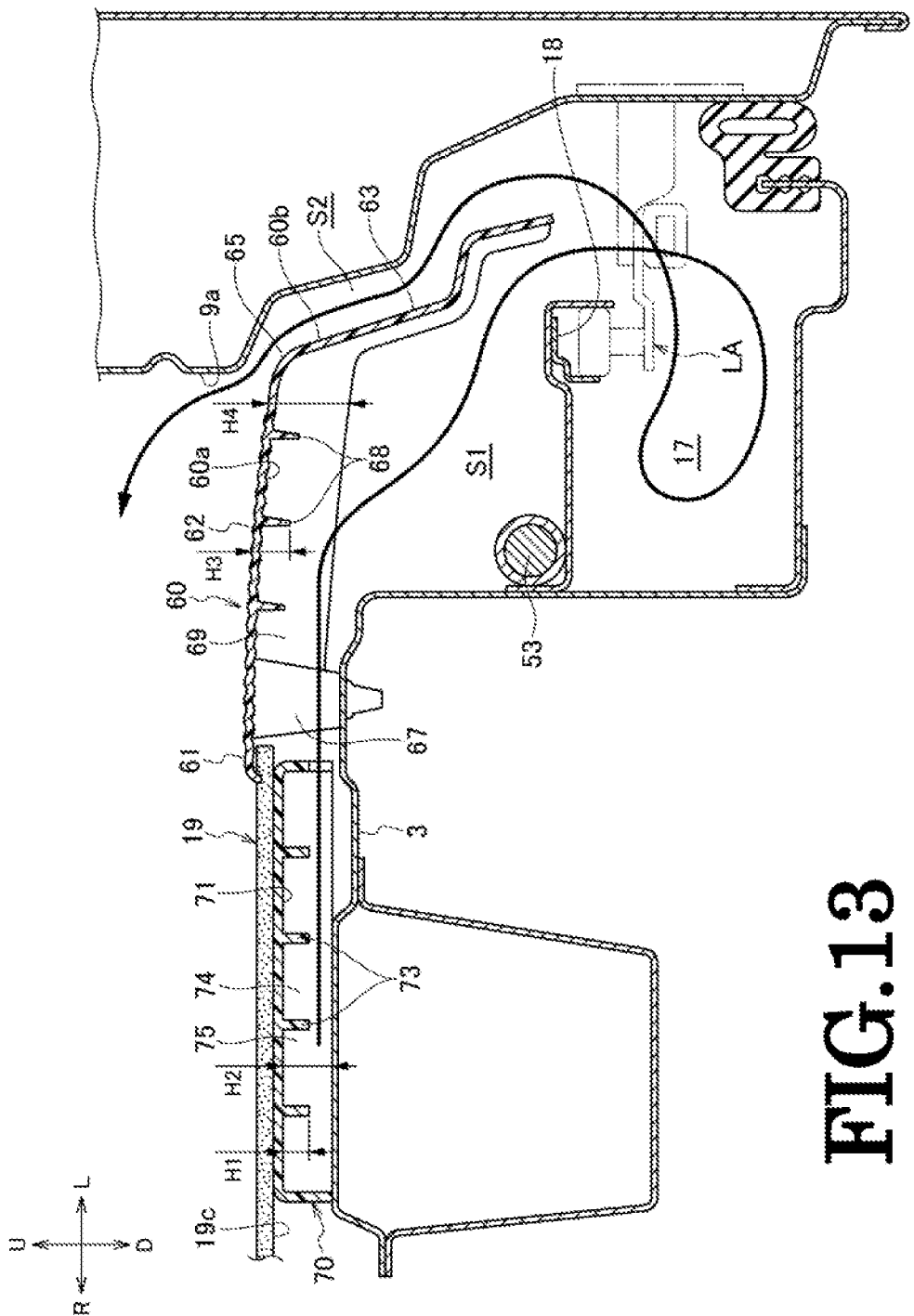
FIG. 13 is a sectional view taken along a line E-E in FIG. 11.

As shown in FIG. 1, in the electric vehicle V of this embodiment, front side doors 6 are supported in front door mounting opening portions 5 which are formed in both side portions of front seats 1 so as to be opened and closed, and sliding doors 9 are provided in rear door mounting opening portions 7 which lie obliquely leftwards and rightwards of the front seats 1 so as to be opened and closed. The sliding doors 9 are supported so as to slide freely by arms provided at an upper portion, a central portion and a lower portion thereof (only a lower arm LA is shown in FIGS. 12, 13).

Steps 60 are provided on a floor panel 3 at portions facing foot portions of the sliding doors 9 so as to lie adjacent to the sliding doors 9. Rail accommodating portions 17 where a rail 18 for guiding the lower arm LA provided at the lower portion of the sliding door 9 is disposed are provided below the steps 60.

As shown in FIGS. 3 to 5 and 11, the electric vehicle V includes a floor F on which the front seats 1 is placed, a framework member 2 which is disposed mainly underneath the floor F, an IPU 20 which is disposed below the front seats 1 and underneath the floor F, and an IPU protection case 8 which accommodates therein the IPU 20.

The floor F includes a substantially plate-like floor panel 3 which is fixed to a pair of floor frames 14 which make up part of the framework member 2, an IPU protection cover 4 which is provided on the floor panel 3 so as to cover the IPU protection case 8, a floor carpet 19 which is an interior member which is affixed to upper surfaces of the floor panel 3 and the IPU protection cover 4, and the steps 60.

Figure 3:
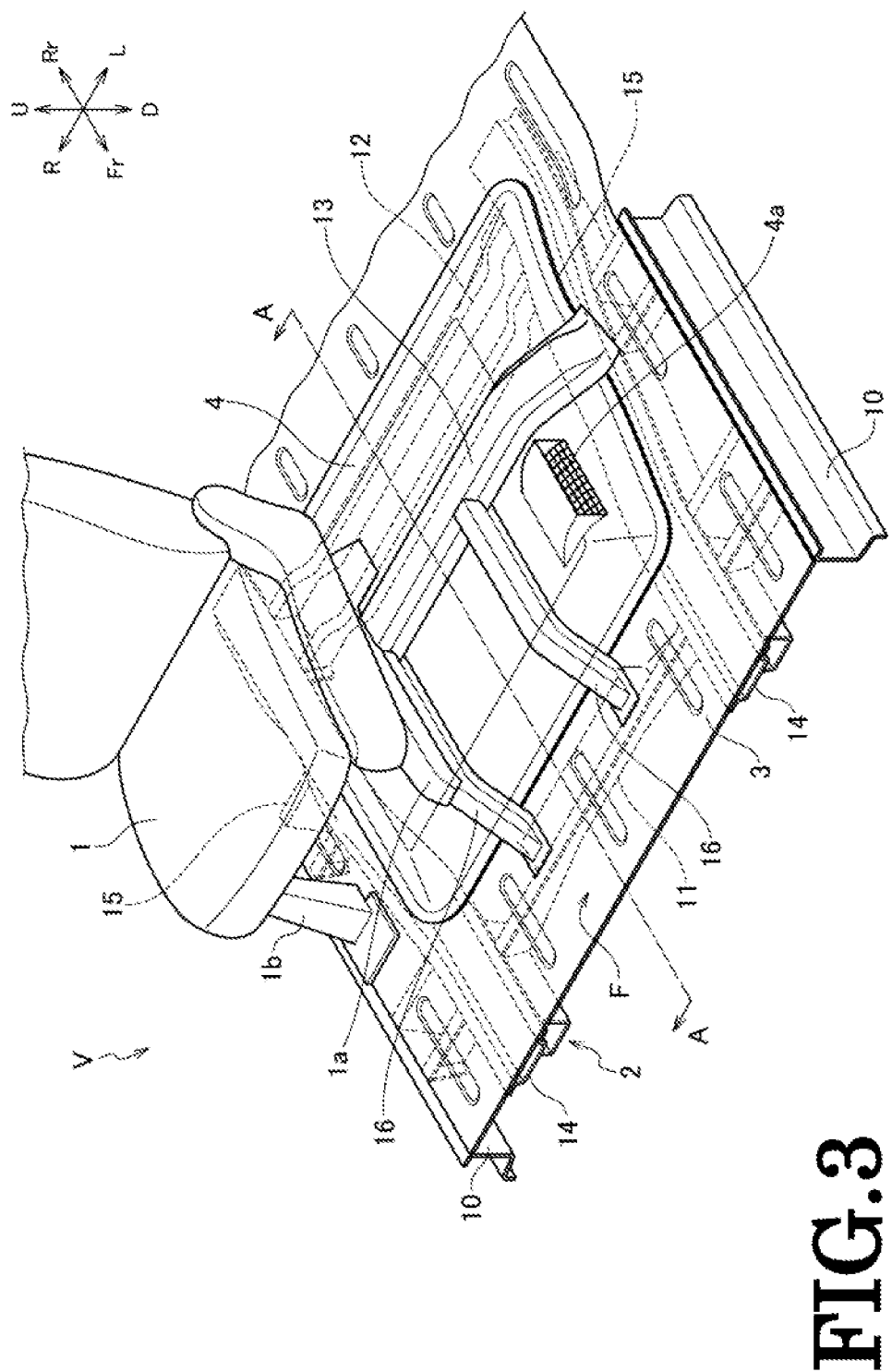
FIG. 3 is a perspective view of a main part of a passenger compartment of the electric vehicle shown in FIG. 1 as viewed down from a left upper portion.
Figure 4:
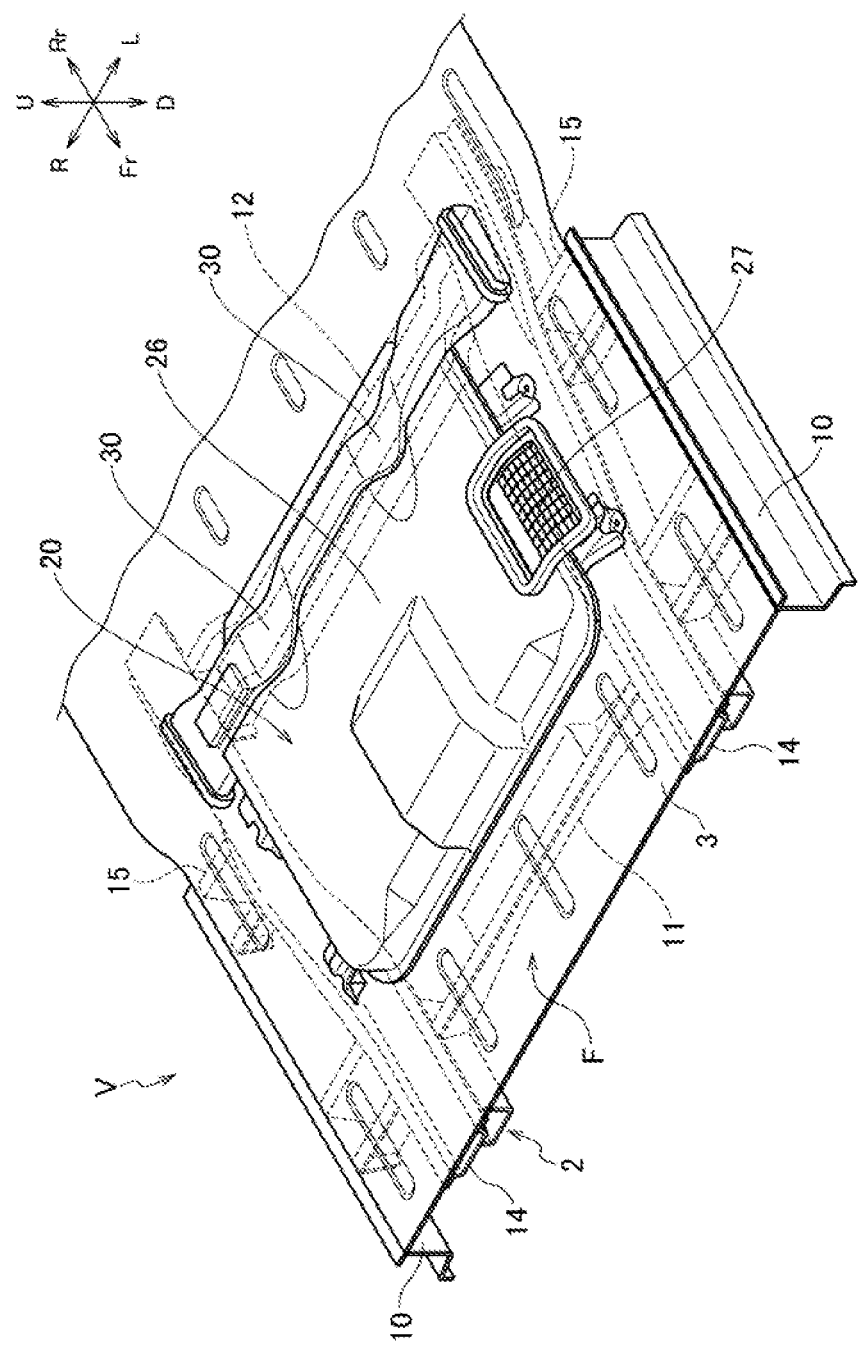
FIG. 4 is a perspective view of the main part of the passenger compartment of the electric vehicle as viewed down from a left upper side, showing an IPU disposed on a floor.

An opening portion 3a is formed in the floor panel 3 in a position which corresponds to a portion lying below the front seats 1, and an upper side of the IPU 20 is disposed to protrude through the floor panel 3 to lie in a space below the front seats 1. In FIG. 3, only the front seat 1 which is a driver's seat is shown, and the front seat 1 which is a front passenger seat is omitted from illustration.

The IPU protection cover 4 is a cover member which protrudes upwards so as to have an interior space on a lower surface side thereof and is fixed onto the floor panel 3 so as to cover the opening portion 3a in the floor panel 3, covering an upper portion of the IPU 20. Further, an air suction port 4a for air used to cool the IPU 20 is provided on a left side of the IPU protection cover 4.

The framework member 2 includes a pair of left and right side sills 10 which extend in a front-rear or longitudinal direction of the vehicle, a first cross member 11, a second cross member 12 and a third cross member 13 which extend in a left-right or transverse direction of the vehicle, the pair of left and right floor frames 14 which are disposed transversely inwards of the side sills 10 and which extend in the longitudinal direction, and a pair of auxiliary frames 15 which extend transversely inwards from the side sills 10 to connect to the corresponding floor frames 14.

The first cross member 11 is fixed in place between the pair of side sills 10 forwards of the IPU 20 and is disposed underneath the floor F. The second cross member 12 is fixed in place between the pair of floor frames 14 rearwards the IPU 20 and is disposed underneath the floor F.

The first cross member 11 and the second cross member 12 are disposed so as to be spaced apart from each other in the longitudinal direction, and a space which is large enough to accommodate the IPU 20 is formed between the first cross member 11 and the second cross member 12.

Figure 5:
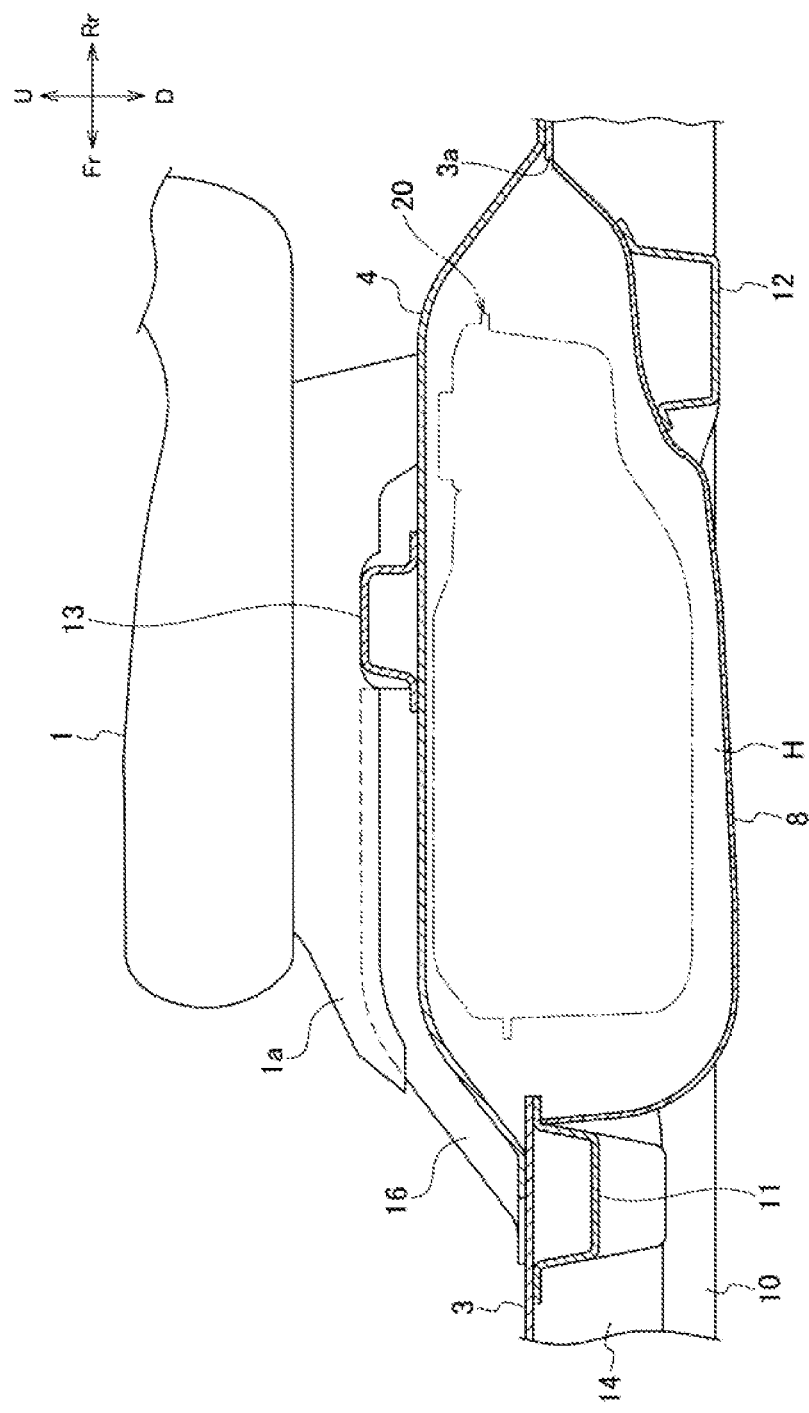
FIG. 5 is a sectional view taken along a line and seen in a direction indicated by line A-A in FIG. 3.
Figure 6:
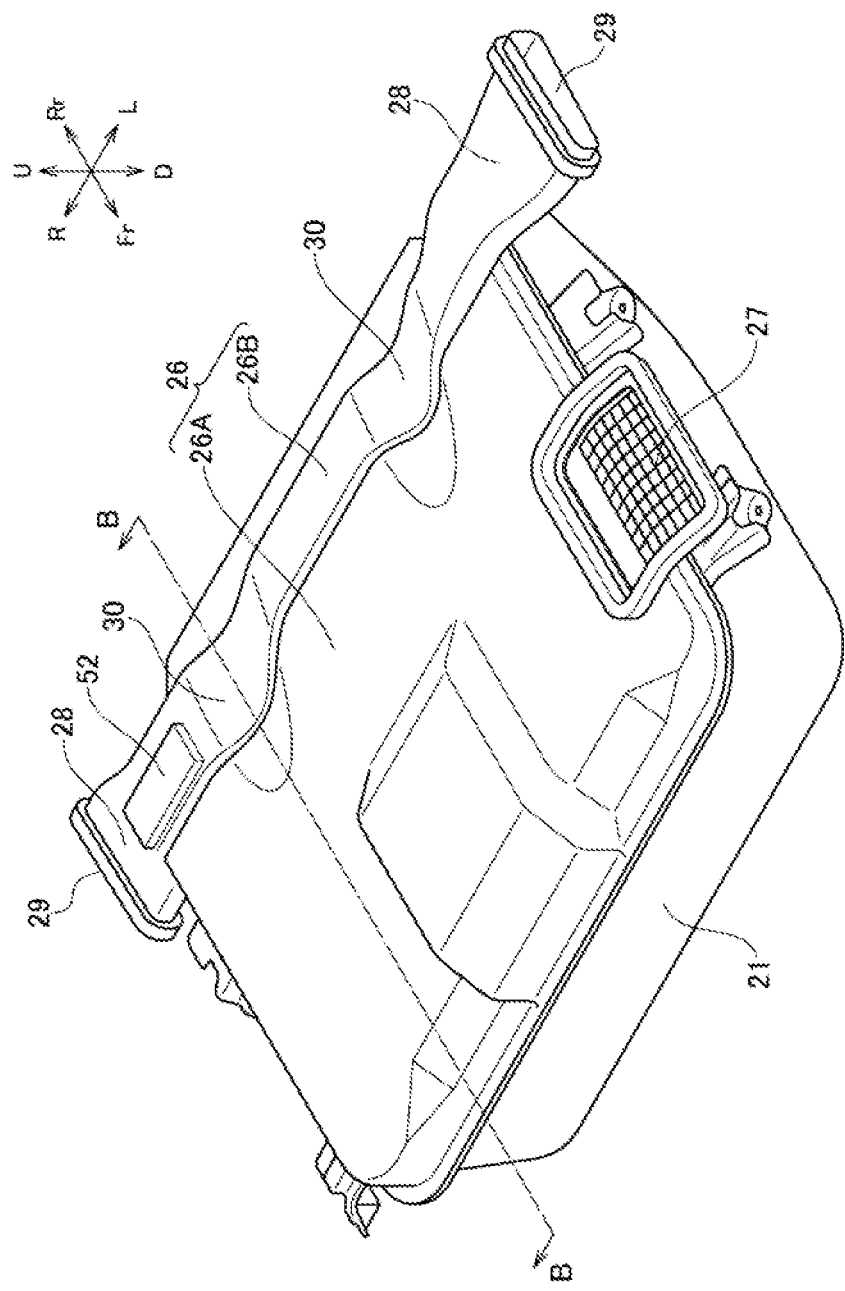
FIG. 6 is an external perspective view of the IPU.

Then, as shown in FIG. 5, the first cross member 11 and the second cross member 12 are provided so that a space defined between the first cross member 11 and the second cross member 12 and a space defined above the second cross member 12 are positioned below the front seats 1, that is, underneath the opening portion 3a in the floor panel 3. By adopting this configuration, a lower portion of the IPU 20 which is disposed so as to straddle the opening portion 3a in the floor panel 3 is accommodated underneath the floor F.

The third cross member 13 is a cross member which is formed integrally with the IPU protection cover 4 and which extends in the transverse direction along the upper surface of the IPU protection cover 4 and is disposed below a longitudinally central portion of the front seats 1. Both ends of the third cross member 13 extend onto the floor panel 3 to be fixed thereto with bolts, not shown, which penetrate the floor panel 3 to be screwed into the corresponding floor frames 14.

Seat supporting members 16 are fastened to the third cross member 13, and these seat supporting members 16 extend forwards from a front surface of the third cross member 13 along the IPU protection cover 4 to be fixed to the first cross member 11. A seat rail 1a for a transversely inner leg portion of the front seat 1 is fastened to each of the seat support members 16. A seat rail 1b for a transversely outer leg portion of each of the front seats 1 is fastened to the floor panel 3. By adopting this configuration, the front seats 1 are supported stably.

The IPU protection case 8 is fixed to the first cross member 11 and the second cross member 12 and covers a front, rear and lower sides of an IPU case 21 which accommodates therein the IPU 20 in such a way as to define a gap H between the lower side of the IPU case 21 and itself to thereby protect the IPU 20 against muddy water or pebbles.

Next, referring to FIGS. 6 to 10, the IPU 20 will be described. The IPU 20 includes electric components such as a plurality of batteries 40, a DC-DC converter 41, an ECU 42, a cooling fan 43, an inverter 44 and the like, and these electric components are accommodated in an IPU accommodating portion 22 of the IPU case 21 while being held on an IPU frame 24.

Figure 7:
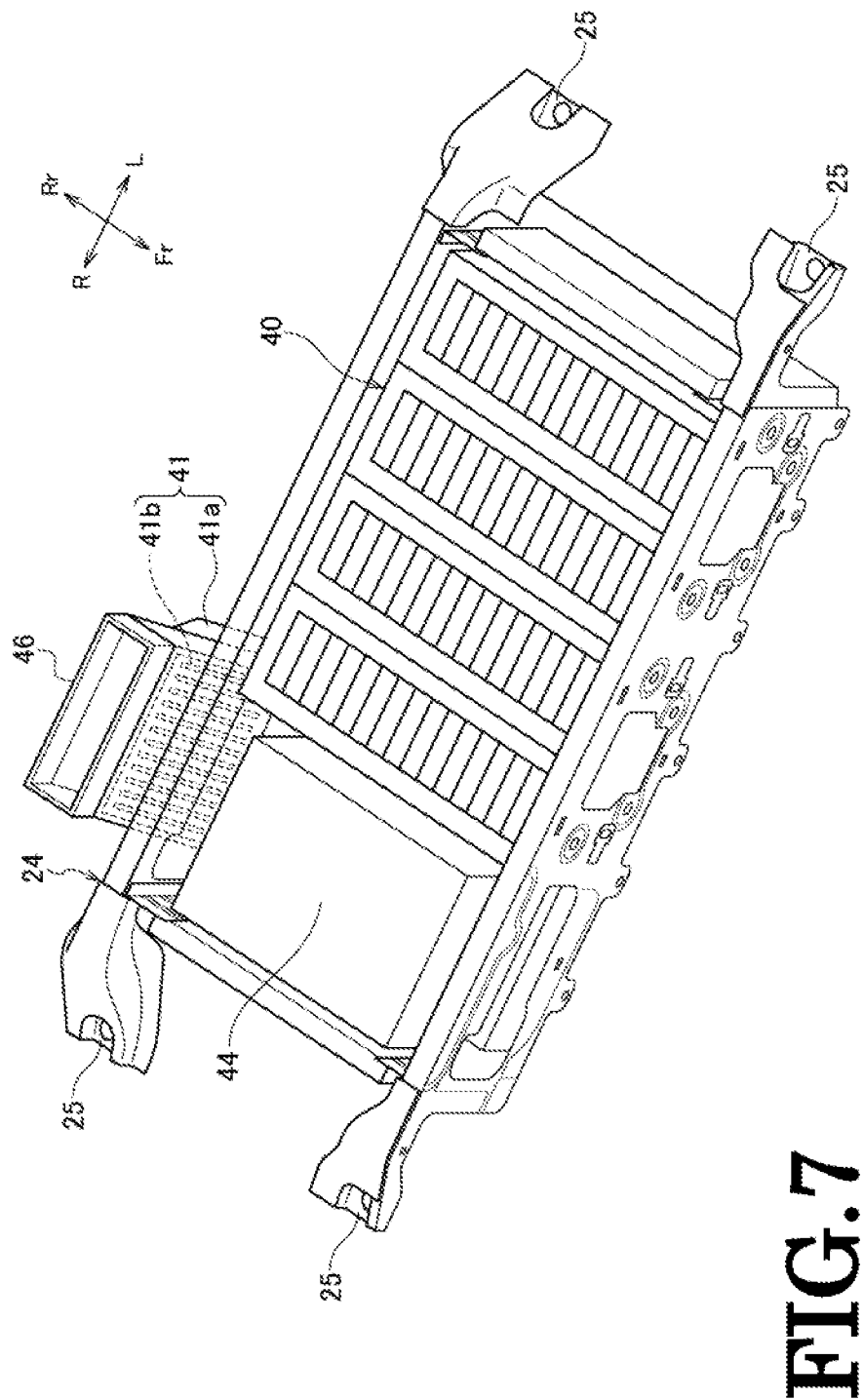
FIG. 7 is a perspective view showing batteries and electric parts which are supported on an IPU frame.
Figure 8:
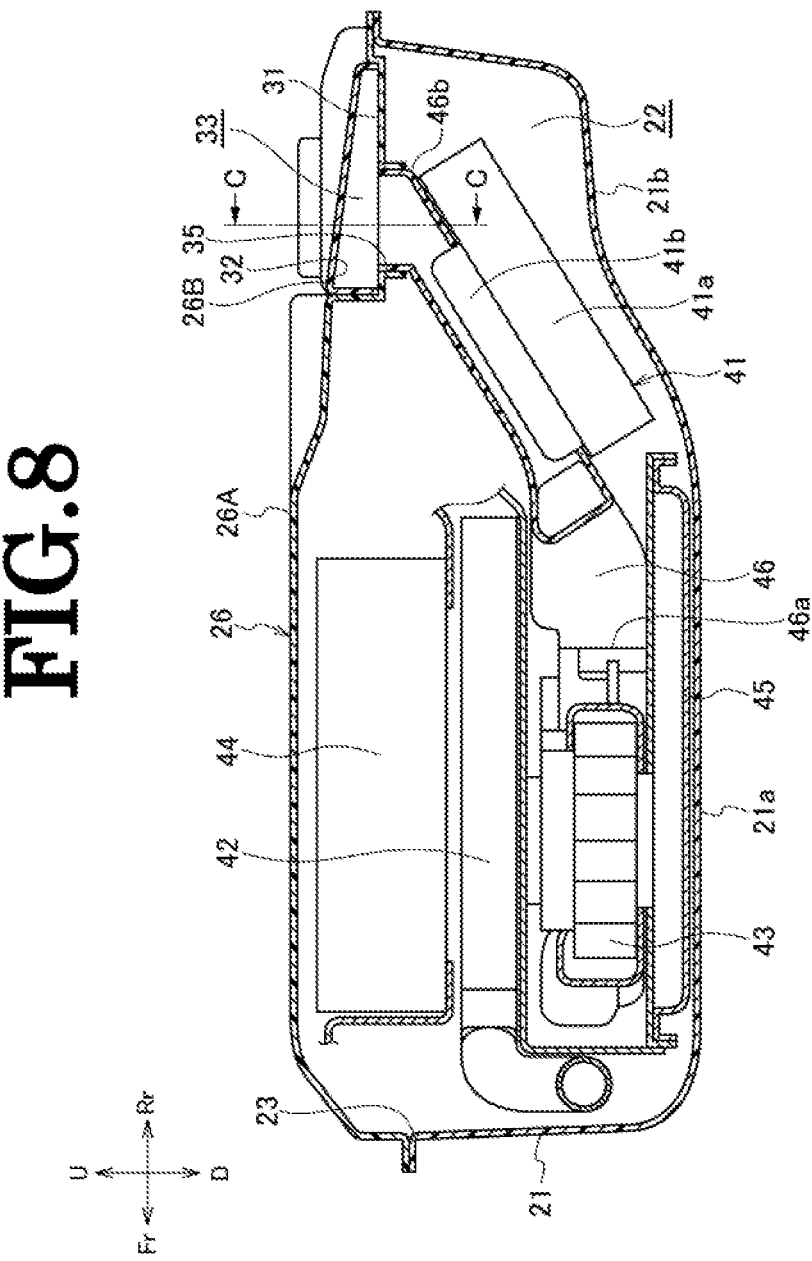
FIG. 8 is a sectional view taken along a line B-B in FIG. 6.
Figure 9:
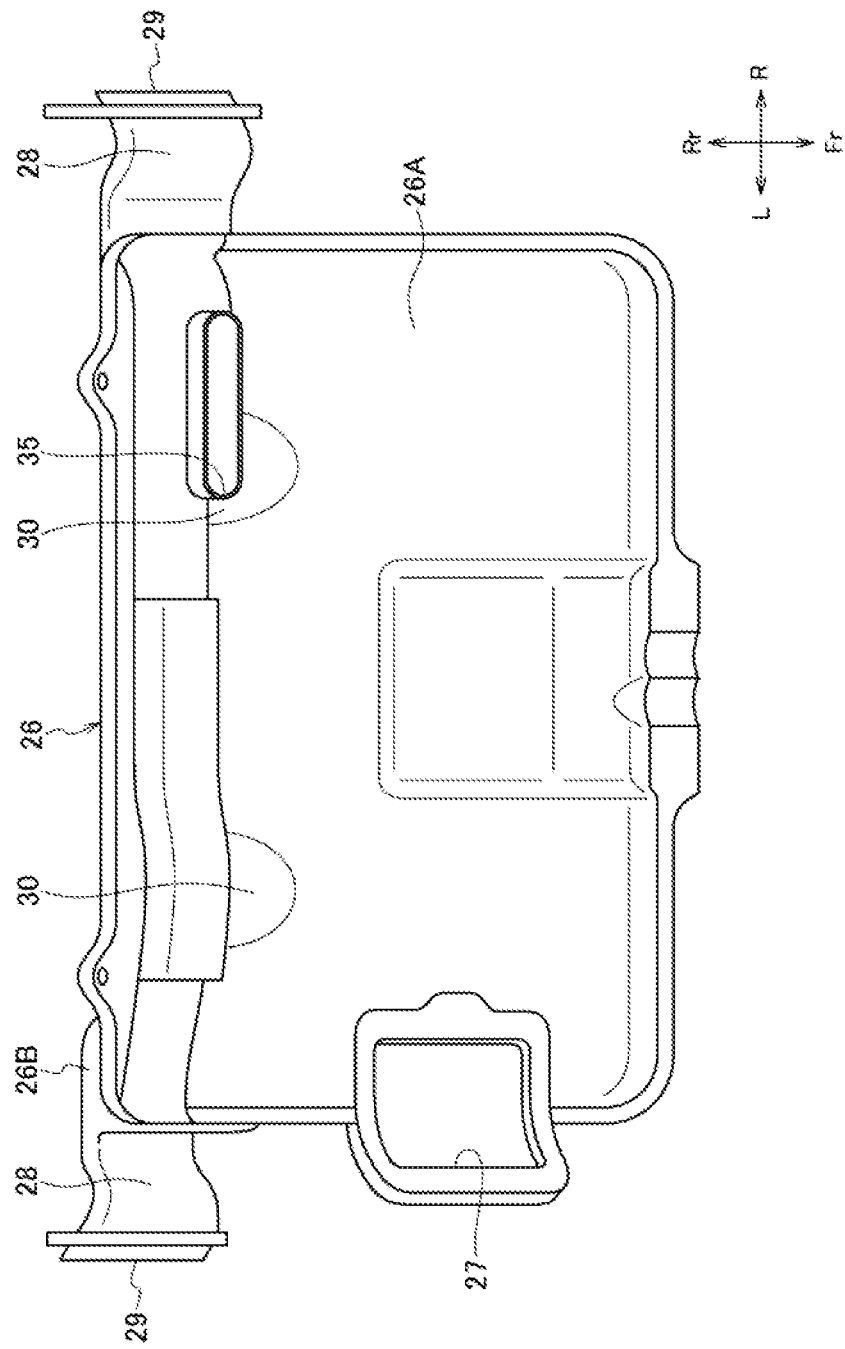
FIG. 9 is a perspective view of an IPU cover as viewed from a rear side thereof.

As shown in FIG. 7, the plurality of batteries 40 are disposed in a left side of the IPU case 21, and the DC-DC converter 41, the ECU 42, the cooling fan 43 and the inverter 44 are disposed in a right side of the IPU case 21. As shown in FIG. 8, the cooling fan 43 is provided in a right bottom portion of the IPU case 21, and the ECU 42 and the inverter 44 are provided above the cooling fan 43. The DC-DC converter 41 is provided in a portion of the electric vehicle V which lies rearwards of the cooling fan 43 and the other electric components which are provided in a superposed fashion while sloping obliquely upwards.

The ECU 42 controls the various pieces of electric equipment of the electric vehicle V. The inverter 44 converts a direct current of the batteries 40 into an alternating current. The cooling fan 43 is a blower which has a cylindrical impeller and is configured to suck in air used to cool the plurality of batteries 40 from an in-case air suction duct 45 situated on a bottom surface side of the IPU case 21 which is one side of the impeller in relation to the direction of a rotational shaft thereof and to discharge the sucked air to an in-case air discharge duct 46 which extends to the rear of the electric vehicle V which is the direction of a tangent of the impeller. The DC-DC converter 41 is designed to drop a voltage of direct current power supplied from the batteries 40, and a plurality of cooling fins 41b are disposed side by side on a rear surface of a DC-DC converter main body 41a. The DC-DC converter 41 is supported on the IPU frame 24 so as to slope obliquely upwards. The DC-DC converter main body 41a is provided outside the in-case air discharge duct 46, and the cooling fins 41b which function as an air flow regulating portion are provided so as to project into the in-case air discharge duct 46. The plurality of cooling fins 41b which are disposed side by side are disposed so as to follow a flowing direction of air which flows inside the in-case air discharge duct 46. Consequently, air discharged from the cooling fan 43 is regulated by the cooling fins 41b in terms of its flowing direction.

The IPU case 21 is a shallow casing which is opened upwards and is formed so that as shown in FIG. 5, a rear bottom portion 21b which is a rear bottom wall of the IPU case 21 lies upwards of a front bottom portion 21a which is a front bottom wall of the IPU case 21. By adopting this configuration, a rear accommodating space of the IPU case 21 is made small in size in relation to a height-wise direction, whereby a space is formed below a rear side of the IPU 20 for installation of the second cross member 12.

In the IPU case 21, an opening portion 23 of the IPU case 21 is covered with an IPU cover 26 with the plurality of batteries 40, the DC-DC converter 41, the ECU 42, the cooling fan 43 and the inverter 44 accommodated in the IPU accommodating portion 22.

In the IPU cover 26, an IPU air inlet port 27 is formed in a position lying slightly forwards on a left side, and side extending portions 28 are provided on both sides on a rear side thereof so as to extend sideways. IPU air outlet ports 29 are formed in end portions of the side extending portions 28. The IPU air inlet port 27 communicates with the air suction port 4a formed in the IPU protection cover 4. Recessed portions 30 are provided on the left and right sides of the IPU cover 26 at a rear portion thereof by depressing a surface of the IPU cover 26 into a concave shape. These recessed portions 30 define spaces between the IPU protection cover 4 and themselves to thereby make up undercuts for a tool which is used for fixing the seats.

The IPU cover 26 is made up of a first IPU cover member 26A which covers the opening portion 23 in the IPU case 21 and a second IPU cover member 26B which covers a rear portion of the first IPU cover member 26A from thereabove, and an air discharge passage 33 which extends in a widthwise direction, that is, the transverse direction is defined by an upper surface 31 of the first IPU cover member 26A and a lower surface 32 of the second IPU cover member. The first IPU cover member 26A is made up of a thin plate having substantially the same shape as that of the opening portion 23 in the IPU case 21, and an air discharge passage introduction port 35 which communicates with the air discharge passage 33 is provided at a right rear portion thereof. The air discharge passage introduction port 35 is connected to the other end 46b of the in-case air discharge duct 46 which is connected to the cooling fan 43 at one end 46a and introduces air discharged from the cooling fan 43 into the air discharge passage 33.

Figure 10:
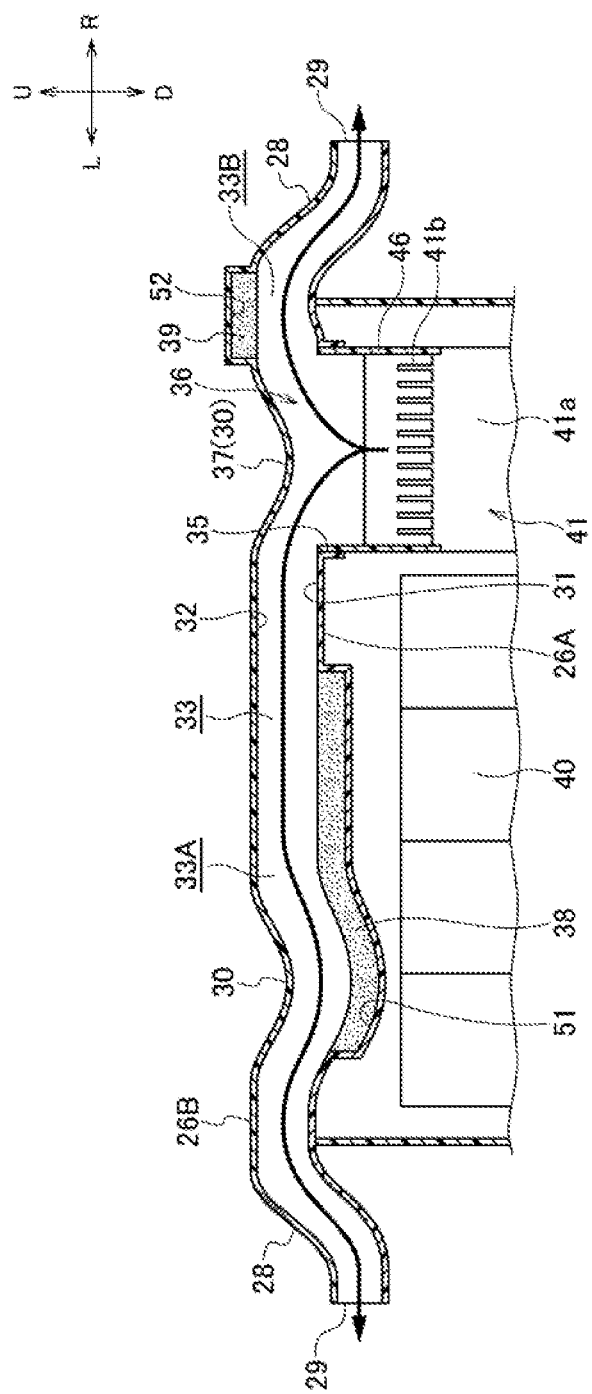
FIG. 10 is a sectional view taken along a line C-C in FIG. 8.
Figure 11:
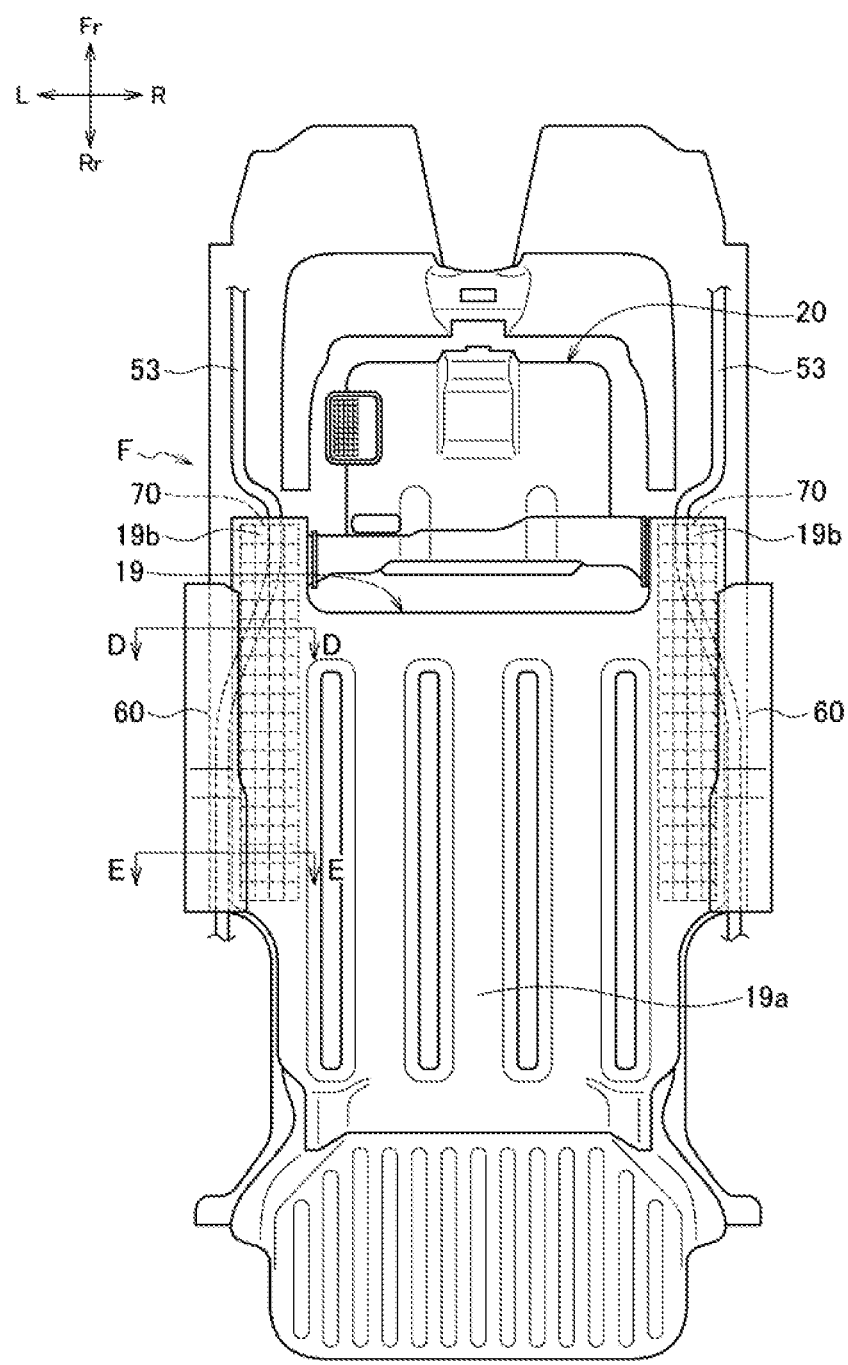
FIG. 11 is a plan view of the floor.

The second IPU cover member 26B is made up of a laterally long thin plate which extends transversely and has formed at left and right end portions thereof the side extending portions 28 which are annular in shape and which extend further sideways than the first IPU cover member 26A. The IPU air outlet ports 29 formed in the side extending portions 28 open towards the transverse direction of the electric vehicle V, which is the width-wise direction thereof and are positioned between the floor panel 3 and the floor carpet 19. As shown in FIG. 10, a portion near the air discharge passage introduction port 35 formed in the first IPU cover member 26A constitutes a branch portion 36 which divides air introduced from the air discharge passage introduction port 35 to the left and right. In the air discharge passage 33, calling a portion lying leftwards of the branch portion 36 a left air discharge passage 33A and a portion lying rightwards of the branch portion 36 a right air discharge passage 33B, air introduced from the air discharge passage introduction port 35 is divided to the left and right at the branch portion 36, part of the air is discharged from the IPU air outlet port 29 of the left side extending portion 28 by way of the left air discharge passage 33A, while the remaining of the air is discharged from the IPU air outlet port 29 of the right side extending portion 28 by way of the right air discharge passage 33B.

A protruding portion 37 which protrudes towards an upstream side in the flowing direction of air is formed at the branch portion 36 as a result of the second IPU cover member 26B protruding downwards, and this makes it possible for the flow of air to be divided smoothly. This protruding portion 37 corresponds to the right recessed portion 30. In other words, by depressing part of the second IPU cover member 26B, the recessed portion 30 is formed upper, while the protruding portion 37 is formed lower.

Noise absorbing members 38, 39 are provided on inner surfaces of the left air discharge passage 33A and the right air discharge passage 33B so as to absorb acoustic energy of noise which is propagated inside the air discharge passage 33. In the left air discharge passage 33A, part of the first IPU cover member 26A protrudes downwards, whereby a noise absorbing material accommodating portion 51 is provided so as to be depressed in the left air discharge passage 33A, and a noise absorbing material 38 is accommodated in the noise absorbing material accommodating portion 51 so as to be exposed to the left air discharge passage 33A. In the right air discharge passage 33A, part of the second IPU cover member 26B protrudes upwards, whereby a noise absorbing material accommodating portion 52 is provided so as to be depressed in the right air discharge passage 33B, and a noise absorbing material 39 is accommodated in the noise absorbing material accommodating portion 52 so as to be exposed to the right air discharge passage 33B. The noise absorbing materials 38, 39 may be fixed in place with an adhesive or may be fixed in place with claws or lugs which are formed on the noise absorbing material accommodating portions 51, 52.

In the IPU 20 configured in the way described heretofore, the plurality of batteries 40, the DC-DC converter 41, the ECU 42, the cooling fan 43 and the inverter 44 which are supported on the IPU frame 24 are accommodated in the IPU accommodating portion 22 of the IPU case 21, and the opening portion 23 of the IPU case 21 is covered with the IPU cover 26. As shown in FIG. 7, as leg portions extending from the IPU case 21, two leg portions 25 are provided on each of left and right sides of the IPU frame 24 while being spaced apart from each other in the longitudinal direction so as to extend transversely outwards from the IPU accommodating portion 22. The leg portions 25 are fastened to the floor panel 3 via reinforcement members (not show) which are fastened directly to the floor frames 14 or are provided so as to extend from the floor frames 14, whereby the IPU case 21 is fixed in place in the opening portion 3a of the floor panel 3 in a suspended fashion.

In an interior of the IPU case 21, the air discharge passage 33 is provided on the IPU cover 26 as a separate space from the IPU accommodating portion 22, and air taken in from the passenger compartment which is introduced from the IPU air inlet port 27 cools the plurality of batteries 40 disposed inside the IPU accommodating portion 22 and thereafter flows into the air discharge passage 33 by way of the in-case air suction duct 45, the cooling fan 43, the in-case air discharge duct 46, and the air discharge passage introduction port 35. Air that passes through the in-case air discharge duct 46 cools the DC-DC converter 41 via the cooling fins 41b which projects into the in-case air discharge duct 46 and is regulated by the cooling fins 41b. The regulated air is introduced into the air discharge passage 33 from the air discharge passage introduction port 35 and is thereafter divided to the left and right by the branch portion 36. Part of the divided air is discharged from the IPU air discharge outlet port 29 at the left side extending portion 28 by way of the left air discharge passage 33A, while the remaining of the air is discharged from the IPU air outlet port 29 at the right side extending portion 28 by way of the right air discharge passage 33B.

Following this, with a view to describing flows of the air discharged from the IPU air discharge ports 29, firstly, referring to FIGS. 2, and 11 to 13, a construction of the floor F from the IPU air outlet port 29 to the rear door mounting opening portion 7 will be described. An arrow in FIG. 13 indicates a flow of exhaust air.

In the floor carpet 19, lug portions 19b are provided on a left and right sides of a front end portion of a carpet main body 19a which is formed in a substantially rectangular shape so as to cover substantially a whole surface of a portion of the floor panel 3 which lies rearwards of the IPU 20 in such a way as to extend therefrom so as to cover the corresponding IPU air outlet ports 29. Resin spaces 70 are provided integrally or separately on a rear surface 19c of the floor carpet 19 along a left and right side edge portions of the floor carpet 19 including the lug portions 19b so as to extend in the longitudinal direction from front end portion to rear end portions of the rear door mounting opening portions 7.

Harnesses 53 are disposed on both lateral longitudinally extending edge portions of the floor panel 3 so as to face the corresponding IPU air outlet ports 29 with a predetermined gap defined therebetween and to extend obliquely rearwards from the IPU air outlet ports 29. The spacers 70 each have a U-like section which opens downwards so as to cover the corresponding harness 53. Longitudinal ribs 73 which extend in the longitudinal direction of the electric vehicle V and transverse ribs 74 which extend in the transverse direction of the electric vehicle V are provided into a grid-like configuration on a rear surface 71 of each of the spacers 70.

Inboard end portions 61 of the steps 60 are disposed on the lateral longitudinally extending edge portions of the floor carpet 19 where the spaces 70 are disposed in such a way as to overlap the spacers 70. The steps 60 each have a substantially L-like section, and a step side wall 63 is provided along a transversely outer edge portion of a step main body 62 which extends substantially parallel to the floor panel 3 in the longitudinal direction so as to extend downwards from the transversely outer edge portion towards the vicinity of the rail accommodating portion 17. A buffer portion 65 where a rear side volumetric capacity is expanded compared with a front of the step 60 is formed at the rear of each of the step 60s as a result of a front surface 60b of the step main body 62 extending upwards drastically to the rear. The steps 60 are fixed to the floor panel 3 via clips 67 which are formed integrally on rear surfaces 60a of the step main bodies 62. Each of the harnesses 53 which extends obliquely to the rear underneath the spacer 70 enters below the step 60 just before the buffer portion 65 and extends to the rear by passing through an under-step space S1 which is provided between a lower side of the step 60 and the rail accommodating portion 17.

In addition, vertical ribs 68 which extends in the longitudinal direction of the electric vehicle V and horizontal ribs 69 which extends in the transverse direction of the electric vehicle V are also provided in to a grid-like configuration on the rear surface 60a of each of the steps 60.

In the floor F configured in the way described heretofore, air discharged from the IPU air outlet ports 29 which are disposed between the floor panel 3 and the floor carpet 19 is introduced into the rear surfaces 71 of the spacers 70 which are provided underneath the floor carpet 19 near the lug portions 19b of the floor carpet 19 and is guided by the longitudinal ribs 73 while being guided by the harnesses 53 which extend obliquely to the rear, flowing from the front to the rear of the spacers 70. Namely, the spaces between the floor panel 3 and the floor carpet 19 and more specifically, the spaces formed between the floor panel 3 and the spacers 70 constitute air discharge passages 75.

As shown in FIG. 12, in the ribs which are formed on the rear surface 71 of each of the spacers 70a so as to make up the air discharge passages 75, the height H1 of the longitudinal ribs 73 is higher than a height H2 of the transverse ribs 74, which makes it easy for exhaust air to pass along the rear surface 71 of the spacer 70 from the front towards the rear of the electric vehicle V. In addition, as shown in FIG. 13, at a portion of the step 60 which lies adjacent to the buffer portion 65, the height H1 of the longitudinal ribs 73 is lower than the height 2 of the transverse ribs 74, which allows exhaust air to be guided by the transverse ribs 74 so as to be introduced into the buffer portion 65 of the step 60. The volumetric capacity of the buffer portion 65 is made greater than those at the front of the step 60 and the rear space of the spacer 70, which mitigates the directionality of exhaust air in the buffer portion 65.

In relation to the ribs formed on the rear surface 60a of each of the buffer portions 65, a height H4 of the horizontal ribs 69 is higher than a height H3 of the vertical ribs 68, and the air introduced into the buffer portion 65 is guided further from the inner side towards the outer side of the step 60 by the horizontal ribs 69 and is further guided downwards by the step side wall 63 to thereby be discharged into the rail accommodating portion 17 by way of the under-step space S1. A volumetric capacity of the rail accommodating portion 17 is greater than that of the buffer portion 65, and hence, the exhaust air introduced in the rail accommodating portion 17 is dispersed therein. The air staying in the rail accommodating portion 17 passes through a gap S2 defined between the front surface 60b of the step 60 and an inner surface 9a of the sliding door 9 when the sliding door 9 is closed to flow back into the passenger compartment. In this way, exhaust air is dispersed by passing through the rail accommodating portion 17 and the exhaust air without directionality flows back into the passenger compartment. All exhaust air may not pass through the buffer portion 65 described above, and hence, a part of the exhaust air may be discharged into the rail accommodating portion 17 by way of the under-step space S1 just before the buffer portion 65.

Thus, as has been described heretofore, according to the embodiment, since the cooling fins 41b which are formed integrally with the DC-DC converter 41 are disposed on an upstream side of the branch portion 36, exhaust air can be regulated so properly by the cooling fins 41b to be divided by the branch portion 36. This allows the exhaust air to be divided smoothly to thereby reduce the pressure loss. Additionally, since the DC-DC converter 41 can be cooled via the cooling fins 41*b* in regulating the flow of exhaust air, the cooling efficiency is also increased. Further, compared with a case where an air flow regulating portion is provided separately, the cooling fins 41*b* of the DC-DC converter 41 are made use of as the air flow regulating portion, whereby the number of components involved can be reduced, and the IPU 20 can be made small in size.

Since the protruding portion 37 which protrudes towards the upstream side in the flowing direction of air used to cool the DC-DC converter 41 is provided at the branch portion 36 which divides air used to cool the DC-DC converter 41, the air can be divided more smoothly, whereby the pressure loss can be reduced and the generation of noise can be suppressed.

The cooling fan 43 is provided at the bottom portion of the IPU case 21, and the electric equipment such as the ECU 42 and the like are provided above the cooling fan 43. In addition to this, since the DC-DC converter 41 is provided rearwards of the cooling fan 43 in the longitudinal direction of the electric vehicle V while being sloped obliquely upwards, the electric equipment such as the ECU 42 and the like, the DC-DC converter 41 and the cooling fan 43 can be accommodated in compact within the IPU case 21, and this allows the IPU case 21 to be installed in compact in the electric vehicle V with its longitudinal length contracted.

The air discharge passage 33 which functions as the air discharge portion which communicates with the IPU accommodating portion 22 and which discharges air used to cool the batteries 40 is formed on the IPU cover 26, and the IPU air outlet ports 29 are provided at the end portions of the air discharge passage 33. Thus, compared with a case where an air discharge duct formed separately from the IPU cover 26 is assembled to the IPU cover 26, such an air discharge duct does not have to be laid out in the vehicle, whereby not only is the installation of the IPU 20 in the electric vehicle V is facilitated but also the assembling performance is increased.

The IPU cover 26 includes the first IPU cover member 26A which covers the opening portion 23 in the IPU case 21 and the second IPU cover member 26B which covers part of the first IPU cover member 26A from thereabove, and the air discharge passage 33 is defined by the first IPU cover member 26A and the second IPU cover member 26B. Thus, the IPU 20 integrated with the air discharge passage can be made up by the simple configuration.

Since the IPU air outlet ports 29 open to the transverse direction of the vehicle, the air discharge passage does not have to be bent, thereby making it possible to reduce the pressure loss.

Since the IPU air inlet port 27 which communicates with the IPU accommodating portion 22 is provided on the IPU cover 26, not only an air discharge duct but also an air suction duct does not have to be laid out in the electric vehicle V, which facilitates further the installation of the IPU 20 in the electric vehicle V and improves the assembling performance.

Since the IPU 20 is disposed below the front seats 1, the installation of the IPU 20 in the electric vehicle V is facilitated.

Since the IPU air outlets 29 discharge air between the floor panel 3 and the floor carpet, air used to cool the batteries 40 can be discharged into the passenger compartment without an air discharge duct laid out in the vehicle.

The air discharge passage 33 which communicates with the IPU accommodating portion 22 and which discharges air used to cool the batteries 40 is formed on the IPU cover 26, and the air discharge passage 33 extends towards at least one side in the transverse direction of the vehicle and has the IPU air outlet port 29 at the end portion on the at least one side thereof. Thus, compared with a case where an air discharge duct formed separately from the IPU cover 26 is assembled to the IPU cover 26, such an air discharge duct does not have to be laid out in the vehicle, whereby not only is the installation of the IPU 20 in the electric vehicle V facilitated but also the assembling performance is increased. Additionally, since the air discharge passage 33 extends in the transverse direction of the vehicle, the IPU 20 can be made small in size in relation to the longitudinal direction of the vehicle.

The air discharge passage 33 extends towards both sides in the transverse direction of the vehicle and has the IPU air outlet ports 29 at the end portions of the both sides. Thus, exhaust air can be dispersed. Since the protruding portion 37 which protrudes towards the upstream side in the flowing direction of air used to cool the batteries 40 is provided at the branch portion 36 which divides air used to cool the batteries into both sides of the transverse direction, the air can be divided smoothly, whereby not only can the pressure loss be reduced but also the generation of noise can be suppressed.

Since the noise absorbing materials 38, 39 are provided on the inner surface of the air discharge passage 33, the acoustic energy of noise which is propagated inside the air discharge passage 33 can be absorbed. Since the noise absorbing materials 38, 39 are accommodated in the noise absorbing material accommodating portions 51, 52 which are provided on the air discharge passage 33 so as to be depressed, respectively, so as to be exposed to the air discharge passage 33, the projection of the noise absorbing materials 38, 39 into the air discharge passage 33 can be suppressed. Further, noise can be reduced over a relatively wide range of frequencies by exposing the noise absorbing materials 38, 39 to the interior of the air discharge passage 33.

The IPU cover 26 includes the first IPU cover member 26A which covers the opening portion 23 in the IPU case 21 and the second IPU cover member 26B which covers part of the first IPU cover member 26A from thereabove, and the air discharge passage 33 is defined by the first IPU cover member 26A and the second IPU cover member 26B. Thus, the IPU 20 integrated with the air discharge passage can be made up by the simple configuration. Further, in stalling the IPU 20 in other vehicles of different specifications, the IPU 20 can be installed in those vehicles without changing the design of the IPU cover 26 entirely but changing the design of only the second IPU cover member 26B.

Since the IPU air outlet ports 29 open to the transverse direction of the vehicle, the air discharge passage does not have to be bent, thereby making it possible to reduce the pressure loss.

Since the IPU air inlet port 27 which communicates with the IPU accommodating portion 22 is provided on the IPU cover 26, not only an air discharge duct but also an air suction duct does not have to be laid out in the electric vehicle V, which facilitates further the installation of the IPU 20 in the electric vehicle V and improves the assembling performance.

Since the IPU air outlets 29 discharge air between the floor panel 3 and the floor carpet, air used to cool the batteries 40 can be discharged into the passenger compartment without an air discharge duct laid out in the vehicle.

The air discharge path through which air used to cool the batteries 40 is discharged includes the air discharge passage 33 which extends in the transverse direction of the vehicle from the batteries 40 and the air discharge passages 75 which connect not only to the air discharge passage 33 but also to the under-step spaces S1 which are provided underneath the steps 60, and the exhaust passages 75 communicate with the rail accommodating portions 17 by way of the under-step spaces S1. Thus, air used to cool the batteries 40 is discharged into the rail accommodating portions 17 which constitute the lowest portions of the passenger compartment. Consequently, the flow of exhaust air can be cooled and the temperature of exhaust air can be reduced in the rail accommodating portions 17, whereby the exhaust air can be dispersed to thereby being introduced into the passenger compartment in a moderate fashion. This restrains the occupant from feeling uncomfortable. Additionally, since the rail accommodating portions 17 constitute the lowest portions of the passenger compartment and lie near the sliding doors 9, the rail accommodating portions 17 constitute the portions whose temperatures are the lowest in the passenger compartment. Thus, the coefficient of heat exchange is also improved by discharging air into the rail accommodating portions 17.

Since the air discharge passages 75 are spaces defined by the floor panel 3 and the floor carpet 19 which covers part of the floor panel 3, no air discharge duct is necessary to thereby reduce the number of components involved, and no air discharge duct needs to be laid out in the vehicle to thereby increase the assembling performance.

The air discharge passages 75 are configured so as to include the spaces defined by the floor panel 3 and the spacers 70 which are provided integrally with or separately from the floor carpet 19, thereby making it possible to make use of the spacers 70 which reinforce the floor carpet 19 as the air discharge paths.

The air discharge passage 33 is the air discharge passage which is formed integrally on the IPU cover 26, and therefore, compared with a case where an air discharge duct formed separately from the IPU cover 26 is assembled to the IPU cover 26, the necessity of laying out such an air discharge duct in the vehicle is obviated, whereby the assembling performance is increased.

The spacers 70 each have the U-like section which opens downwards, and the longitudinal ribs 73 and the transverse ribs 74 are formed into the grid-like configuration on the rear surface of each of the spacers 70. Additionally, the air discharge passages 75 include the regions where the height H1 of the longitudinal ribs 73 is higher than the height H2 of the transverse ribs 74. Thus, exhaust air is guided in the longitudinal direction in these regions. Consequently, the longitudinal ribs 73 can be made use of as flow regulator plates so as to guide exhaust air into the steps 60 smoothly.

Since the harnesses 53 extend obliquely to the rear from the corresponding IPU air outlet ports 29 of the air discharge passage 33, side walls of the harnesses 53 can be made use of as flow regulator walls to thereby guide exhaust air towards the steps 60.

The steps 60 each have the buffer portion 65 whose volumetric capacity is increased compared with that of the front portion thereof at the rear, and the air discharge passages 75 communicate with the corresponding rail accommodating portions 17 by way of the buffer portions 65 of the steps 60, thereby making it possible to reduce the pressure loss. Additionally, the exhaust air is discharged into the passenger compartment after its directionality is mitigated, whereby the occupant can be restrained from being caused to feel uncomfortable by the air flowing back into the passenger compartment.

The vertical ribs 68 and the horizontal ribs 69 are formed into the grid-like configuration on the rear surface 60a of each of the step main bodies 62, and the air discharge passages 75 communicate with the corresponding rail accommodating portions 17 by way of the regions where the height H4 of the horizontal ribs 69 is higher than the height H3 of the vertical ribs 68. Thus, the horizontal ribs 69 can be made use of as flow regulator plates, whereby exhaust air can be guided into the rail accommodating portions 17 smoothly.

The air discharge path through which air used to cool the batteries 40 is includes the air discharge passage 33 which extends in the transverse direction of the vehicle from the batteries 40 and the air discharge passages 75 which connect not only to the air discharge passage 33 but also to the under-step spaces S1 which are provided underneath the steps 60, and the air discharge passages 75 are the spaces defined by the floor panel 3 and the floor carpet 19 which covers part of the floor panel 3. This obviates the necessity of air discharge ducts, whereby not only can the number of components involved be reduced but also such discharge ducts do not have to be laid out in the vehicle, the assembling performance being thereby increased.

Thus, as has been described heretofore, the following matters are disclosed in this description.

(1). A vehicle high-voltage system equipment unit (e.g., the IPU 20 in the embodiment) includes:
  a high-voltage system equipment (e.g., a DC-DC converter 41 in the embodiment); and
  a cooling fan (e.g., a cooling fan 43 in the embodiment) for taking in air from a passenger compartment,
  wherein the high-voltage system equipment is cooled with air taken in from the passenger compartment,
  wherein the cooling fan is provided on an upstream side of the high-voltage system equipment, and an air discharge portion (e.g., an air discharge passage 33 in the embodiment) is provided on a downstream side of the high-voltage system equipment,
  wherein a branch portion (e.g., a branch portion 36 in the embodiment) for dividing a flow of air used to cool the high-voltage system equipment is provided in the air discharge portion,
  wherein an air flow regulating portion (e.g., cooling fins 41b in the embodiment) is provided on an upstream side of the branch portion, and
  wherein the air flow regulating portion is formed integrally with the high-voltage system equipment.

(2). The vehicle high-voltage system equipment unit according to (1),
  wherein a protruding portion (e.g., the protruding portion 37 in the embodiment) which protrudes towards an upstream side in a flowing direction of the air used to cool the high-voltage system equipment is provided at the branch portion.

(3). The vehicle high-voltage system equipment unit according to (1) or (2), further including: an electric equipment (e.g., the ECU 42, the inverter 44 in the embodiment); and a case (e.g., the IPU case 21 in the embodiment) for accommodating therein the electric equipment, the high-voltage system equipment and the cooling fan,
  wherein the cooling fan is provided in a bottom portion of the case,
  wherein the electric equipment is provided above the cooling fan, and
  wherein the high-voltage system equipment is provided on one side in a front-rear direction of a vehicle with respect to the cooling fan and is inclined obliquely upwards.

(4). The vehicle high-voltage system equipment unit according to (3),
- wherein an opening portion (e.g., the opening portion 23 in the embodiment) of the case is covered with a cover (e.g., the IPU cover 26 in the embodiment),
- wherein an air discharge portion through which the air used to cool the high-voltage system equipment is discharged is formed integrally on the cover, and
- wherein the air discharge portion has an air outlet port (e.g., the IPU air outlet ports 29 in the embodiment) at an end portion thereof.

(5). The vehicle high-voltage system equipment unit according to (4),
- wherein the cover includes: a first cover member (e.g., the first IPU cover member 26A in the embodiment) which covers the opening portion of the case; and a second cover member (e.g., the second IPU cover member 26B in the embodiment) which covers a part of the first cover member from thereabove or therebelow,
- wherein the air discharge portion is defined by the first cover member and the second cover member, and
- wherein an air introduction port (e.g., the air discharge passage introduction port 35 in the embodiment) through which the air used to cool the high-voltage system equipment is introduced into the air discharge portion is formed on the first cover member or the second cover member.

(6). The vehicle high-voltage system equipment unit according to (4) or (5),
- wherein the air discharge portion extends in a transverse direction of a vehicle, and
- wherein the air outlet port opens towards the transverse direction.

(7). The vehicle high-voltage system equipment unit according to any one of (4) to (6),
- wherein an air inlet port (e.g., the IPU air inlet port 27 in the embodiment) which communicates with an interior of the case is provided on the cover.

(8). A vehicle including the vehicle high-voltage system equipment unit according to any one of (1) to (7),
- wherein the vehicle high-voltage system equipment unit is disposed below a seat (e.g., the front seats 1 in the embodiment) of the vehicle.

(9). A vehicle including the vehicle high-voltage system equipment unit according to any one of (4) to (7),
- wherein the air outlet port discharges air between a floor panel (e.g., the floor panel 3 in the embodiment) and a floor carpet.

As to (1) to (9) described heretofore, for example, the following modifications and improvements can be made thereto.

In the embodiment, while the DC-DC converter 41 is described as the high-voltage system equipment, the high-voltage system equipment is not limited to the DC-DC converter 41 and hence may be the inverter 44 or other high-voltage system equipment.

In the embodiment, the IPU 20 is described as a unit that unitized with the batteries 40 in addition to the high-voltage system equipment such as the DC-DC converter 41 and the like. However, the batteries 40 do not necessarily have to be unitized together with the high-voltage system equipment, and hence, the high-voltage system equipment may be accommodated in the IPU 20 together with the cooling fan 43.

In the embodiment, the IPU 20 is described as being disposed below the front seat 1. However, the invention is not limited thereto, and hence, the IPU 20 may be disposed below a rear seat or may be disposed in or underneath a luggage compartment.

In the embodiment, the air discharge passage 33 is such that air introduced from the air discharge passage introduction port 35 is divided to the left and right at the branch portion 36. However, the introduced air may not be divided and discharged from either of the left and right direction.

The IPU 20 is not limited to the one integrated with the air discharge passage, and hence, an air discharge duct and/or an air intake duct may be connected to the IPU 20.

(10). A vehicle battery unit (e.g., the IPU 20 in the embodiment) includes:
- a battery (e.g., batteries 40 in the embodiment) having a battery accommodating portion (e.g., an IPU accommodating portion 22 in the embodiment) that accommodates therein the battery;
- a case (e.g., an IPU case 21 in the embodiment) having a battery accommodating portion that accommodates therein the battery; and
- a cover (e.g., an IPU cover 26 in the embodiment) that covers an opening portion (e.g., an opening portion 23 in the embodiment) of the case,
- wherein the battery is cooled with air taken in from a passenger compartment,
- wherein an air discharge passage (e.g., the air discharge passage 33 in the embodiment) is formed on the cover so as to communicate with the battery accommodating portion and discharge the air used to cool the battery, and
- wherein the air discharge passage extends towards at least one side of a vehicle in a transverse direction thereof and has an air outlet port (e.g., an IPU air outlet port 29 in the embodiment) at an end portion on the at least one side of the vehicle.

(11). The vehicle battery unit according to (10),
- wherein the air discharge passage extends to both sides of the vehicle in the transverse direction and has air outlet ports at both end portions,
- wherein the air discharge passage includes a branch portion (e.g., the branch portion 36 in the embodiment) which divides a flow of the air used to cool the battery to the both sides of the vehicle in the transverse direction, and
- wherein a protruding portion (e.g., the protruding portion 37 in the embodiment) which protrudes towards an upstream side in a flowing direction of the air used to cool the battery is provided at the branch portion.

(12). The vehicle battery unit according to (10) or (11),
- wherein a noise absorbing material (e.g., the noise absorbing materials 38, 39 in the embodiment) is provided on an inner surface of the air discharge passage.

(13). The vehicle battery unit according to (12),
- wherein a noise absorbing material accommodating portion (e.g., the noise absorbing material accommodating portions 51, 52 in the embodiment) for accommodating the noise absorbing material is provided in the air discharge passage so as to be depressed, and
- wherein the noise absorbing material is accommodated in the noise absorbing material accommodating portion so as to be exposed to the air discharge passage.

(14). The vehicle battery unit according to any one of (10) to (13),
- wherein the cover includes: a first cover member (e.g., the first IPU cover member 26A in the embodiment) which covers an opening portion of the case; and a second cover member (e.g., the second IPU cover member 26B in the embodiment) which covers a part of the first cover member from thereabove or therebelow, and wherein the air discharge passage is defined by the first cover member and the second cover member, and wherein an air discharge passage introduction port (e.g., the air discharge passage introduction port 35 in the embodiment) through which the air used to cool the battery is introduced into the air discharge passage is formed on the first cover member or the second cover member.

(15). The vehicle battery unit according to any one of (10) to (14), wherein the air outlet port opens towards the transverse direction of the vehicle.

(16). The vehicle battery unit according to any one of (10) to (15), wherein an air inlet port (e.g., the IPU air inlet port 27 in the embodiment) which communicates with an interior of the battery accommodating portion is provided on the cover.

(17). A vehicle including the vehicle battery unit according to any one of (10) to (16), wherein the air outlet port discharges air between a floor panel (e.g., the floor panel 3 in the embodiment) and a floor carpet.

As to (10) to (17) described heretofore, for example, the following modifications and improvements can be made thereto.

In the embodiment, the IPU 20 is described as a unit that unitized the electric components such as the DC-DC converter 41, the ECU 42, the cooling fan 43 and the like in addition to the batteries 40. However, the electric components do not necessarily have to be unitized together with the batteries 40, and hence, the IPU 20 can be a battery unit in which the batteries 40 are accommodated in a case and a cover.

In the embodiment, the IPU 20 is described as being disposed below the front seat 1. However, the invention is not limited thereto, and hence, the IPU 20 may be disposed below a rear seat or may be disposed in or underneath a luggage compartment.

In the embodiment, the air discharge passage 33 is such that air introduced from the air discharge passage introduction port 35 is divided to the left and right at the branch portion 36. However, the introduced air may not be divided and discharged from either of the left and right direction.

In the embodiment, the IPU cover 26 is made up of the first IPU cover member 26A which covers the opening portion 23 in the IPU case 21 and the second IPU cover member 26B which covers a part of the first IPU cover member 26A from thereabove, and the air discharge passage introduction port 35 is provided on the first IPU cover member 26A. However, the second IPU cover member 26B may cover a part of the first IPU cover member 26A from therebelow, and the air discharge passage introduction port 35 may be provided on the second IPU cover member 26B.

The IPU 20 may be such that an air suction duct is connected to the IPU 20.

(18). A vehicle includes:
a front seat (e.g., front seats 1 in the embodiment);
a battery (e.g., the batteries 40 in the embodiment) which is accommodated in a battery accommodating portion (e.g., an IPU protection case 8 in the embodiment) provided on a floor panel (e.g., a floor panel 3 in the embodiment) and which is disposed below the front seat;

a sliding door (e.g., sliding doors 9 in the embodiment) which is positioned obliquely rearwards of the front seat;

a step (e.g., steps 60 in the embodiment) which is disposed on the floor panel so as to lie adjacent to the sliding door; and a rail accommodating portion (e.g., rail accommodating portions 17 in the embodiment) which is positioned underneath the step and in which a rail (e.g., rails 18 in the embodiment) for guiding a sliding movement of the sliding door is disposed, wherein the battery is cooled with air taken in from a passenger compartment wherein an air discharge path for discharging air used to cool the battery includes: a first air discharge path (e.g., the air discharge passage 33 in the embodiment) which extends in a transverse direction of the vehicle from the battery; and a second air discharge path (e.g., air discharge passages 75 in the embodiment) which is connected to the first air discharge path and an under-step space (e.g., under-step space S1 in the embodiment) provided underneath the step, and wherein the second air discharge path communicates with the rail accommodating portion by way of the under-step space.

(19). The vehicle according to (18), wherein the second air discharge path is a space defined by the floor panel and a floor carpet (e.g., the floor carpet 19 in the embodiment) which covers at least a part of the floor panel.

(20). The vehicle according to (19), wherein the floor carpet includes a spacer (e.g., the spacers 70 in the embodiment) integrally with or separately therefrom on an end portion of the transverse direction thereof, and wherein the second air discharge path includes a space defined by the floor panel and the spacer.

(21). The vehicle according to any one of (18) to (20), wherein the battery is accommodated in a case (e.g., the IPU case 21 in the embodiment) and is covered with a cover (e.g., the IPU cover 26 in the embodiment) which covers an opening portion (e.g., the opening portion 23 in the embodiment) of the case, and wherein the first air discharge path is an air discharge passage which is formed integrally on the cover.

(22). The vehicle according to (20), wherein the spacer has a U-like section which opens downwards, wherein longitudinal ribs (e.g., the longitudinal ribs 73 in the embodiment) which extend in a longitudinal direction of the vehicle and transverse ribs (e.g., the transverse ribs 74 in the embodiment) which extend in a transverse direction of the vehicle are provided into a grid-like configuration on a rear surface of the spacer, and wherein the second air discharge path includes a region where a height (e.g., the height H1 in the embodiment) of the longitudinal ribs is higher than a height (e.g., the height H2 in the embodiment) of the transverse ribs.

(23). The vehicle according to (22), wherein the step includes:
a step main body (e.g., the step main body 62 in the embodiment) which extends in the longitudinal direction substantially parallel to the floor panel; and
a step side wall (e.g., the step side wall 63 in the embodiment) which extends downwards from an outer edge portion of the step main body to a vicinity of the rail accommodating portion, wherein vertical ribs (e.g., the vertical ribs 68 in the embodiment) which extend in the longitudinal direction of the vehicle and horizontal ribs (e.g., the horizontal ribs 69 in the embodiment) which extend in the transverse direction of the vehicle are formed into a grid-like configuration on a rear surface (e.g., the rear surface 60a in the embodiment) of the step main body, wherein the second air discharge path communicates with the rail accommodating portion by way of a region where a height (e.g., the height H4 in the embodiment) of the horizontal ribs is higher than a height (e.g., the height H3 in the embodiment) of the vertical ribs.

(24). The vehicle according to any one of (18) to (23), wherein the step has a buffer portion (e.g., the buffer portion 65 in the embodiment) whose volumetric capacity is expanded compared with that of a front portion at a rear portion thereof, and wherein the second air discharge path communicates with the rail accommodating portion by way of the buffer portion of the step.

(25). The vehicle according to any one of (18) to (24), wherein a harness (e.g., the harnesses 53 in the embodiment) is disposed so as to extend obliquely to a rear side from the air outlet port of the first air discharge path.

(26). A vehicle includes:

a front seat (e.g., the front seats 1 in the embodiment);

a battery (e.g., the batteries 40 in the embodiment) which is accommodated in a battery accommodating portion (e.g., the IPU protection case 8 in the embodiment) provided on a floor panel (e.g., the floor panel 3 in the embodiment) and which is disposed below the front seat;

a sliding door (e.g., the sliding doors 9 in the embodiment) which is positioned obliquely rearwards of the front seat; and a step (e.g., the steps 60 in the embodiment) which is disposed on the floor panel so as to lie adjacent to the sliding door, wherein the battery is cooled with air taken in from a passenger compartment, wherein an air discharge path for discharging air used to cool the battery includes: a first air discharge path (e.g., the air discharge passage 33 in the embodiment) which extends in a transverse direction from the battery; and a second air discharge path (e.g., an air discharge passage 75 in the embodiment) which is connected to the first air discharge path and an under-step space (e.g., the under-step spaces S1 in the embodiment) provided underneath the step, and wherein the second air discharge path is a space defined by the floor panel and a floor carpet (e.g., the floor carpet 19 in the embodiment) which covers at least a part of the floor panel.

(27). The vehicle according to (26), wherein the floor carpet includes a spacer integrally with or separately therefrom on an end portion of the transverse direction thereof, and wherein the second air discharge path includes a space (e.g., the spacers 70 in the embodiment) defined by the floor panel and the spacer.

As to (18) to (27) described heretofore, for example, the following modifications and improvements can be made thereto.

In the embodiment, the IPU 20 is described as a unit that unitized the electric components such as the DC-DC converter 41, the ECU 42, the cooling fan 43 and the like in addition to the batteries 40. However, the electric components do not necessarily have to be unitized together with the batteries 40, and hence, the IPU 20 can be a battery unit in which the batteries 40 are accommodated in a case and a cover.

In the embodiment, the IPU 20 is described as being disposed below the front seat 1. However, the invention is not limited thereto, and hence, the IPU 20 may be disposed below a rear seat or may be disposed in or underneath a luggage compartment.

In the embodiment, the air discharge passage 33 is such that air introduced from the air discharge passage introduction port 35 is divided to the left and right at the branch portion 36. However, the introduced air may not be divided and discharged from either of the left and right direction.

In the embodiment, the IPU cover 26 is made up of the first IPU cover member 26A which covers the opening portion 23 in the IPU case 21 and the second IPU cover member 26B which covers a part of the first IPU cover member 26A from thereabove, and the air discharge passage introduction port 35 is provided on the first IPU cover member 26A. However, the second IPU cover member 26B may cover a part of the first IPU cover member 26A from therebelow, and the air discharge passage introduction port 35 may be provided on the second IPU cover member 26B.

The IPU 20 is not limited to the one integrated with the air discharge passage, and hence, an air discharge duct and/or the air intake duct may be connected to the IPU 20.

The step 60 does not have to have the buffer portion 65.

The flow of air used to cool the batteries 40 may be cooled and the temperature of air used to cool the batteries 40 may be reduced in the under-step spaces S1, so that air being discharged is dispersed to be introduced into the passenger compartment in a moderate fashion.

According to (1) described above, exhaust air can be regulated without increasing the number of components by forming the air regulating portion integrally with the high-voltage system equipment, and the cooling efficiency of the high-voltage system equipment is increased. In addition, the exhaust air can be divided smoothly by passing through the branch portion after it has been regulated, and a pressure loss can also be reduced.

According to (2) described above, the protruding portion provided at the branch portion protrudes against the exhaust air which flows into the air discharge passage, whereby the exhaust air which has been regulated by the air flow regulating portion can be divided smoothly, thereby making it possible not only to reduce the pressure loss but also to suppress the generation of noise.

According to (3) described above, the electric equipment, the high-voltage system equipment and the cooling fan can be accommodated in compact in the case, and the case whose longitudinal length is reduced can be installed in compact in the vehicle.

According to (4) described above, compared with a case where an air discharge duct formed separately from a cover is assembled to the cover, such an air discharge duct does not have to be laid out in the vehicle, which not only facilitates the installation of the high-voltage system equipment unit in the vehicle but also improves the assembling performance.

According to (5) described above, the battery unit with which the air discharge portion is integrated can be made up with the simple configuration.

According to (6) described above, the air outlet ports are provided at the end portions of the air discharge passage which extends in the transverse direction of the vehicle so as to open towards the transverse direction of the vehicle, whereby the air discharge passage does not have to be bent, thereby making it possible to reduce the pressure loss.

According to (7) described above, not only an air discharge duct but also an air intake duct does not have to be laid out in the vehicle, whereby not only can the battery unit be installed in the vehicle more easily, but also the assembling performance is increased.

According to (8) described above, the vehicle high-voltage system equipment unit can easily be installed in the vehicle.

According to (9) described above, air used to cool the batteries can be discharged into the passenger compartment without laying out an air discharge duct in the vehicle.

According to (10) described above, compared with a case where an air discharge duct formed separately from a cover is assembled to the cover, such an air discharge duct does not have to be laid out in the vehicle, which not only facilitates the installation of the battery unit in the vehicle but also improves the assembling performance. Additionally, since the air discharge passage extends in the transverse direction of the vehicle, the vehicle battery unit can be made small in size in relation to a front-rear or longitudinal direction of the vehicle.

According to (11) described above, the air discharge passage extends towards both sides in the transverse direction of the vehicle and has the air outlet ports at the both end portions thereof in the transverse direction. Thus, exhaust air can be dispersed. Additionally, the protruding portion provided at the branch portion protrudes against exhaust air which flows into the air discharge passage, whereby the exhaust air can be divided smoothly, thereby making it possible not only to reduce the pressure loss but also to suppress the generation of noise.

According to (12) described above, the acoustic energy of noise which is propagated inside the air discharge passage 33 can be absorbed.

According to (13) described above, the noise absorbing materials are prevented from projecting into the air discharge passage while allowing the noise absorbing materials to be exposed to the interior of the air discharge passage, thereby making it possible to reduce the noise over the relatively wide range of frequencies.

According to (14) described above, the battery unit with which the air discharge passage is integrated can be made up with the simple configuration.

According to (15) described above, the air outlet ports are provided at the end portions of the air discharge passage which extends in the transverse direction of the vehicle so as to open towards the transverse direction of the vehicle, whereby the air discharge passage does not have to be bent, thereby making it possible to reduce the pressure loss.

According to (16) described above, not only an air discharge duct but also an air suction duct does not have to be laid out in the vehicle, whereby not only can the battery unit be installed in the vehicle more easily, but also the assembling performance is increased.

According to (17) described above, air used to cool the batteries can be discharged into the passenger compartment without laying out an air discharge duct in the vehicle.

According to (18) described above, air used to cool the batteries is discharged into the rail accommodating portion which constitutes the lowest portion of the passenger compartment to thereby cool down the flow of exhaust air and the temperature of the exhaust air, thereby making it possible to introduce the exhaust air into the passenger compartment in a dispersed and moderate fashion. This restrains the occupant from feeling uncomfortable. Additionally, since the rail accommodating portion constitutes the lowest portion of the passenger compartment and lies near the sliding door, the rail accommodating portion constitutes a portion whose temperature is the lowest in the passenger compartment. Thus, the coefficient of heat exchange is also improved by discharging the exhaust air into the rail accommodating portion.

According to (19) described above, since no air discharge duct is necessary, not only can the number of components involved be reduced but also no air discharge duct is necessary to be laid out in the vehicle, thereby the assembling performance being increased.

According to (20) described above, the spacers which are intended to reinforce the floor carpet can be used as the discharged air flow paths. In addition, since no air discharge duct is necessary, not only can the number of components involved be reduced but also no air discharge duct is necessary to be laid out in the vehicle, thereby the assembling performance being increased.

According to (21) described above, compared with a case where an air discharge duct formed separately from a cover is assembled to the cover, such an air discharge duct does not have to be laid out in the vehicle, which improves the assembling performance.

According to (22) described above, the floor carpet can be reinforced by the longitudinal ribs and the transverse ribs which are provided into the grid-like configuration. In addition, exhaust air is guided in the longitudinal direction by the region where the longitudinal ribs are taller than the transverse ribs. Consequently, the longitudinal ribs can be made use of as flow regulator plates so as to guide the exhaust air into the steps smoothly.

According to (23) described above, the steps can be reinforced by the vertical ribs and the horizontal ribs which are provided into the grid-like configuration. In addition, since the horizontal ribs are taller than the vertical ribs, exhaust air is guided in the transverse direction. Consequently, the horizontal ribs can be made use of as flow regulator plates so as to guide exhaust air into the rail accommodating portions smoothly.

According to (24) described above, the pressure loss can be reduced by the buffer portion. Additionally, the exhaust air is discharged into the passenger compartment after its directionality is mitigated, whereby the occupant can be restrained from being caused to feel uncomfortable by the air flowing back into the passenger compartment.

According to (25) described above, since the side wall of the harness is used as the air flow regulating wall, exhaust air can be guided towards the step.

According to (26) described above, since no air discharge duct is necessary, not only can the number of components involved be reduced but also no air discharge duct is necessary to be laid out in the vehicle, thereby the assembling performance being increased.

According to (27) described above, the spacers which are intended to reinforce the floor carpet can be used as the discharged air flow paths.

The invention is not limited to the embodiment that has been described above and hence can be modified or improved as required. For example, in the embodiment, the electric vehicle using only the motor as the drive source is described as being the vehicle to which the invention is applied. However, the invention is not limited thereto, and hence, for example, the invention may be applied to a hybrid electric vehicle.

This patent application is based on Japanese Patent Application (Nos. 2015-044747, 2015-044748 and 2015-044749) filed on Mar. 6, 2015, the contents of which are incorporated herein by reference.

DESCRIPTION OF REFERENCE NUMERALS AND CHARACTERS

1 Front seat (Seat)
3 Floor panel
8 IPU protection case (Battery accommodating portion)
9 Sliding door
17 Rail accommodating portion
18 Rail
19 Floor carpet
20 IPU (Vehicle high-voltage system equipment unit, Vehicle battery unit)
21 IPU case (Case)
22 IPU accommodating portion (Battery accommodating portion)
23 Opening portion
26 IPU cover (Cover)
26A First IPU cover member (First cover member)
26B Second IPU cover member (Second cover member)
27 IPU air inlet port (Air inlet port)
29 IPU air discharge port
33 Air discharge passage (Air discharge portion, First air discharge path)
35 Air discharge passage introduction port
36 Branch portion
37 Protruding portion
38 Noise absorbing material
39 Noise absorbing material
40 Battery
41 DC-DC converter (High-voltage system equipment)
41b Cooling fin (Air Flow Regulating portion)
42 ECU (Electric equipment)
43 Cooling fan
44 Inverter (Electric equipment)
51 Noise absorbing material accommodating portion
52 Noise absorbing material accommodating portion
53 Harness
60 Step
60a Rear surface
62 Step main body
65 Buffer portion
68 Vertical rib
69 Horizontal rib
70 Spacer
73 Longitudinal rib
74 Transverse rib
75 Air discharge passage (Second air discharge path)
H1 Height of longitudinal rib
H2 Height of transverse rib
H3 Height of vertical rib
H4 Height of horizontal rib
S1 Under-step space

The invention claimed is:
1. A vehicle comprises:
a front seat;
a battery which is accommodated in a battery accommodating portion provided on a floor panel and which is disposed below the front seat;
a sliding door which is positioned obliquely rearwards of the front seat;
a step which is disposed on the floor panel so as to lie adjacent to the sliding door; and
a rail accommodating portion which is positioned underneath the step and in which a rail for guiding a sliding movement of the sliding door is disposed,
wherein the battery is cooled with air taken in from a passenger compartment
wherein an air discharge path for discharging air used to cool the battery comprises: a first air discharge path which extends in a transverse direction of the vehicle from the battery; and a second air discharge path which is connected to the first air discharge path and an under-step space provided underneath the step, and
wherein the second air discharge path communicates with the rail accommodating portion by way of the under-step space.

2. The vehicle according to claim 1,
wherein the second air discharge path is a space defined by the floor panel and a floor carpet which covers at least a part of the floor panel.

3. The vehicle according to claim 2,
wherein the floor carpet includes a spacer integrally with or separately therefrom on an end portion of the transverse direction thereof, and
wherein the second air discharge path includes a space defined by the floor panel and the spacer.

4. The vehicle according to claim 3,
wherein the spacer has a U-like section which opens downwards,
wherein longitudinal ribs which extend in a longitudinal direction of the vehicle and transverse ribs which extend in a transverse direction of the vehicle are provided into a grid-like configuration on a rear surface of the spacer, and
wherein the second air discharge path comprises a region where a height of the longitudinal ribs is higher than a height of the transverse ribs.

5. The vehicle according to claim 4,
wherein the step comprises:
a step main body which extends in the longitudinal direction substantially parallel to the floor panel; and
a step side wall which extends downwards from an outer edge portion of the step main body to a vicinity of the rail accommodating portion,
wherein vertical ribs which extend in the longitudinal direction of the vehicle and horizontal ribs which extend in the transverse direction of the vehicle are formed into a grid-like configuration on a rear surface of the step main body,
wherein the second air discharge path communicates with the rail accommodating portion by way of a region where a height of the horizontal ribs is higher than a height of the vertical ribs.

6. The vehicle according to claim 1,
wherein the battery is accommodated in a case and is covered with a cover which covers an opening portion of the case, and
wherein the first air discharge path is an air discharge passage which is formed integrally on the cover.

7. The vehicle according to claim 1,
wherein the step has a buffer portion whose volumetric capacity is expanded compared with that of a front portion at a rear portion thereof, and wherein the second air discharge path communicates with the rail accommodating portion by way of the buffer portion of the step.

8. The vehicle according to claim 1,
wherein a harness is disposed so as to extend obliquely to a rear side from the air outlet port of the first air discharge path.

9. A vehicle comprises:
a front seat;
a battery which is accommodated in a battery accommodating portion provided on a floor panel and which is disposed below the front seat;
a sliding door which is positioned obliquely rearwards of the front seat; and
a step which is disposed on the floor panel so as to lie adjacent to the sliding door,
wherein the battery is cooled with air taken in from a passenger compartment,
wherein an air discharge path for discharging air used to cool the battery comprises: a first air discharge path which extends in a transverse direction from the battery; and a second air discharge path which is connected to the first air discharge path and an under-step space provided underneath the step,
wherein the second air discharge path is a space defined by the floor panel and a floor carpet which covers at least a part of the floor panel, and
wherein a surface of the step extends upwards towards a rear direction of the vehicle.

10. The vehicle according to claim 9,
wherein the floor carpet includes a spacer integrally with or separately therefrom on an end portion of the transverse direction thereof, and
wherein the second air discharge path includes a space defined by the floor panel and the spacer.

\* \* \* \* \*